(12) United States Patent
Biggerstaff

(10) Patent No.: US 9,038,037 B1
(45) Date of Patent: May 19, 2015

(54) AUTOMATICALLY SOLVING SIMULTANEOUS TYPE EQUATIONS FOR TYPE DIFFERENCE TRANSFORMATIONS THAT REDESIGN CODE

(71) Applicant: Ted James Biggerstaff, Austin, TX (US)

(72) Inventor: Ted James Biggerstaff, Austin, TX (US)

(73) Assignee: Ted J. Biggerstaff, Austin, TX (US)

( * ) Notice: Subject to any disclaimer, the term of this patent is extended or adjusted under 35 U.S.C. 154(b) by 0 days.

(21) Appl. No.: 14/337,487

(22) Filed: Jul. 22, 2014

(51) Int. Cl.
*G06F 9/45* (2006.01)
(52) U.S. Cl.
CPC ..................... *G06F 8/437* (2013.01)
(58) Field of Classification Search
USPC .......... 717/114–116, 141–143, 101, 108, 140
IPC ............... G06F 17/30731,17/30864, 8/20, 8/21, G06F 8/36
See application file for complete search history.

(56) References Cited

U.S. PATENT DOCUMENTS

| | | | | |
|---|---|---|---|---|
| 5,923,879 A * | 7/1999 | Sasmazel et al. | ............. | 717/143 |
| 6,754,887 B1 * | 6/2004 | Gil et al. | ....................... | 717/116 |
| 7,096,455 B2 * | 8/2006 | Santiago | .................... | 717/114 |
| 7,165,237 B2 * | 1/2007 | Thiruvillamalai | ............ | 717/108 |
| 7,254,808 B2 * | 8/2007 | Trappen et al. | ................ | 717/143 |
| 7,496,892 B2 * | 2/2009 | Nuss | .................... | 717/114 |
| 7,571,425 B2 * | 8/2009 | Lessly | .................... | 717/108 |
| 7,631,291 B2 * | 12/2009 | Shukla et al. | .................. | 717/107 |
| 7,680,935 B2 * | 3/2010 | Szyperski et al. | ............ | 709/226 |
| 7,681,186 B2 * | 3/2010 | Chang et al. | .................. | 717/143 |
| 7,761,858 B2 * | 7/2010 | Chang et al. | .................. | 717/140 |
| 7,810,080 B2 * | 10/2010 | Plum et al. | ..................... | 717/140 |
| 7,836,428 B2 * | 11/2010 | Mitchell et al. | ............... | 717/117 |
| 8,042,090 B2 * | 10/2011 | Janiesch et al. | ............... | 717/102 |
| 8,296,730 B2 * | 10/2012 | Whitechapel et al. | ........ | 717/116 |
| 8,843,877 B2 * | 9/2014 | Dutta et al. | .................... | 717/101 |
| 8,949,784 B2 * | 2/2015 | Langworthy et al. | .......... | 717/117 |

OTHER PUBLICATIONS

Mishra et al, "Declaration-free Type Checking", ACM, pp. 7-20, 1984.*
Najjar et al "The role of constructor in the context of refactoring object oriented systems" IEEE, Proceedings of the Seventh European Conference on Software Maintenance and Reengineering (CSMR'03) pp. 1-9, 2003.*
Bessonov et al, "Integrability Conditions for Parameterized Linear Difference Equations", ACM, pp. 45-52, 2013.*

(Continued)

*Primary Examiner* — Anil Khatri

(57) ABSTRACT

A method and a system for first, expressing relationships between design contexts as a set of simultaneous parameterized type equations and then, automatically solving those type equations to produce type difference transformations that automatically convert code from one design context to a different design context. For example, a set of solution transforms might redesign code from a simple image convolution expression within a specification context to a set of thread based, parallelized expressions of the convolution designed to fit the "holes" within a design framework from a reusable library. The type equations are expressed in terms a generalization of programming data types (called Context Qualified Types or CQ Types) that may have embedded variable parameters. In addition to programming data type information, CQ Types incorporate design features or concepts that fall outside of the programming data type domain (e.g., a planned program scope or a design skeleton).

16 Claims, 20 Drawing Sheets

(56) References Cited

OTHER PUBLICATIONS

Bhatnagar et al, "Optimal Parameter Trajectory Estimation in Parameterized SDEs: An Algorithmic Procedure", ACM Transactions on Modeling and Computer Simulation, vol. 19, No. 2, Article 8, pp, 1-27, 2009.*

Chen et al, "Extending Type Inference to Variational Programs", ACM Transactions on Programming Languages and Systems, vol. 36, No. 1, Article 1, pp, 1-54, 2014.*

Mostifaoui et al, "Context-Aware Computing: A Guide for the Pervasive Computing Community", IEEE, pp. 39-48, 2004.*

* cited by examiner

| Type Constructor Form | Comments |
|---|---|
| (DSDefArray (<D1> <D2> ...) <atype> <keyword parms>) | <Di> is a dimension of the array. If the dimensions list is nil, the resulting type is the supertype of all arrays returning <type>. <atype> is the array element type. <keyword parms> are specializers. |
| (DSDefArray <tag> (<D1> <D2> ...) <atype> <keyword parms>) | <tag> is a C-like tag name allowing re-use without re-writing |
| (DSDefUnion<br>((<utype1> <name1> <keyword parms>)<br>(<utype2> <name2> <keyword parms>) ...)) | Each "(<utypei> <namei> <keyword parms>)" type/name/keyword parms group is equivalent to<br>(DSDeclare <utypei> <namei> <keyword parms>). (i.e., it creates an instance namei of type utypei with <keyword parms>) AND ALSO creates the type |
| (DSDefUnion <utag><br>((<utype1> <name1> <keyword parms>)<br>(<utype2> <name2> <keyword parms>) ...)) | (DSDefFieldOP <ftag> (<namei> <utag> <keyword parms>). Keyword parms allow types to be specific to a target program scope. |
| (DSDefStruct<br>((<ptype1> <name1> <keyword parms>)<br>(<ptype2> <name2> <keyword parms>)...)) | Each "(<ptypei> <namei> <keyword parms>)" type/name/keyword parms group is equivalent to<br>(DSDeclare <utypei> <namei> <keyword parms>) ( i.e., it creates an instance namei of type ptypei) AND creates the type |
| (DSDefStruct <stag><br>((<ptype1> <name1> <keyword parms>)<br>(<ptype2> <name2> <keyword parms>...)) | (DSDefFieldOP <ftag> (<namei> <stag> <keyword parms>). <stag> is a subtype of all <ptype> types. |

Fig. 1a

| Type Constructor Form | Comments |
|---|---|
| (DSDefFunop \<tag> (\<parm types>) \<rettype>) | (\<parm types>) is the list of parameter types. It may be nil. |
| (DSDefFunop (\<parm types>) \<rettype>) | \<rettype> is the return type of the function. |
| (DSDefFieldOP<br>(\<fieldname> \<stag> \<keyword parms>)<br>\<resulttype>) | \<stag> is the tag of the struct or union that generated this DSDefFieldOP.<br>\<keyword parms> allow keyword parameters like :dsvalue (for initial values) and :myscope to make type definitions specific to scope objects within the target program being generated. |
| (DSDefFieldOP \<ftag><br>(\<fieldname> \<stag> \<keyword parms>)<br>\<resulttype>) | \<ftag> is the tag name for referencing the field and is human provided or if not human provided, a unique \<ftag> name is generated. |
| (DSDefPtr \<decl> \<keyword parms>) | \<decl> is a type. This creates a specialization of type \<decl>. |
| (DSDefPtr \<ptag>\<decl> \<keyword parms>) | |
| (DSDefMulti \<tag> (\<ptype1> \<ptype2> ...)) | Generates a type with multiple supertypes \<ptype1>, \<ptype2>, etc. |

Fig. 1b

| | |
|---|---|
| `<type> [<stag>]` | Brackets [...] indicate optionality. |
| `[:plqualifiers` | Braces {...} indicate a grouping and double bars \|\| indicate inclusive or. |
| `( { < storageclasses>` | |
| `\|\| <typequalifiers >` | `<type>` is any legal programming data type (e.g., unsigned) and may be specialized by `<keyword parms>` (e.g., ":myscope scope3"). |
| `\|\| <type-spec >` | "plqualifiers" designates qualifiers from the programming data type domain, whereas `<keyword parms>` are qualifiers from the "design context" domain. |
| `\|\| <other-qual>> })]` | |
| `[ <keyword parms>])` | `<storageclass>` includes, for example, auto, extern, register, static and typedef. |
| | `<typequalifiers>` includes, for example, const, restrict, and volatile. |
| | `<type-spec>` includes, for example, short, long, signed, and unsigned. |

Fig. 1c

AUTOMATICALLY SOLVING SIMULTANEOUS TYPE EQUATIONS FOR TYPE DIFFERENCE TRANSFORMATIONS THAT REDESIGN CODE

CROSS-REFERENCE TO RELATED APPLICATIONS

U.S. Pat. No. 8,713,515, Titled "Automated Synchronization of Design Features in Disparate Code Components using Type Differencing," Ted J. Biggerstaff, Application May 13, 2013, Issued Apr. 29, 2014.
U.S. Pat. No. 8,060,857, Titled "Automated Partitioning of a Computation for Parallel or Other High Capability Architecture," Ted J. Biggerstaff, Application Jan. 31, 2009, Issued Nov. 15, 2011.
U.S. Pat. No. 8,225,277, Titled "Non-Localized Constraints for Automated Program Generation," Ted J. Biggerstaff, Application Apr. 25, 2010, Issued Jul. 17, 2012.
U.S. Pat. No. 8,327,321, Titled "Synthetic Partitioning for Imposing Implementation Design Patterns onto Logical Architectures of Computations," Ted J. Biggerstaff, Application Aug. 27, 2011, Issued Dec. 4, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON COMPACT DISC

Not Applicable

BACKGROUND

This invention is implemented on a general purpose computer comprising a processor, memory and associated support hardware (FIG. 1*d*). All algorithms, methods, systems and processes described within this specification execute on this hardware.

This invention extends the invention of U.S. Pat. No. 8,713,515 by developing the machinery for fully automating the generation of specific large grain relationships between composite types and their instances within one design context and corresponding types and their instances within a different design context, and then using those large grain relationships to redesign instances of code from one design context into equivalent code for a different design context. This invention defines how to implicitly specify a plurality of separate but similar concrete large grain relationships between design contexts via a singular set of parameterized simultaneous type equations plus one or more type difference transformations that provide supplementary, elective relationships between types where the relationships between types are not pre-determined by the type constructors and the equations. Further, the invention also specifies the machinery for automatically solving those simultaneous type equations to produce type difference transformations implied by the type specifications. The full set of difference transformations can then be used to automatically redesign code from one design context to a different design context.

OBJECTS AND ADVANTAGES

There are several important mechanisms in this invention:
1. Context Qualified Types (or CQ Types) provide a mechanism for CQ Types to simultaneously specify 1) a computer program data type (e.g., an "int" or "float" data type) and 2) knowledge of or constraints on the program design, building and generation process (e.g., specify a planned but yet to be constructed scope within an evolving but not yet completed design framework). Thus, parts of the generation process and other knowledge that falls outside of the programming language data type domain are expressed as passive data that is bound to elements of the developing program design and acted upon by the automated generation system. By this mechanism, CQ Types allow coordinated manipulation of these two kinds of data (i.e., programming data type data and concepts that fall outside of the programming data type domain) and thereby allow each to influence, coordinate with or affect the other.
2. Anaphoric Reference Protocol for Synchronizing (ARPS) to establish the domain specific (conceptual) relationships between entities in different contexts that need to be synchronized, where the relationships in one context are defined in terms of domain specific information (i.e., domain specific signposts) from the other context.
3. Parameterized CQ Types (also called Progenitor types) allow some concrete details of a CQ Types' definition to be deferred by parameterization until the nature and context of its usage is determined. This allows a single type specification to be the seed of unlimited many concrete type definitions. This multiplicative effect amplifies the profits of program reuse such that a relative small number of progenitor forms may be the ancestors of an unlimited number of concrete progeny. More specifically, Parameterized CQ Types allow deferred, parametric connection between disparate components such as a design framework and a payload for that framework (possibly produced at different times and places). For example, a design framework could introduce new design features (e.g., a C-language like struct field whose value slot is the parameter ?BPvalue). The parameter allows such design features to be specified in the design framework even though they may not be present (and almost certainly will not be present) in a payload component when the design framework and payload are initially brought together for combination. However, given that ARPS can supply a conceptual connection between the parameter ?BPvalue in the design framework and some data item in the payload (e.g., a data matrix B), the type construction machinery can provide the opportunity to construct an explicit connection by creating a chain of functionally related types connecting the two. Such a type chain is designed to allow synchronization between the design framework and the payload. That is, the type chain allows data elements from the payload (e.g., a data matrix B) to be redesigned for the design framework context such that the redesigned instance will exploit the additional design feature (or features) of the design framework and thereby be suitable for direct use within an instantiated version of the design framework. While the ARPS specification is not the only way to make such connections, in some cases it may be the most and efficient way for the generator to make the initial and critical "conceptual connection" between the parameter ?BPvalue in the framework and the data matrix B in the payload.

4. Simultaneous, parameterized CQ Type equations allow several CQ Type relationships (i.e., expressions) to share common elements across those relationships (via variable parameters) and thereby jointly constrain the solutions (i.e., the values of the parameters) that jointly satisfy all of the simultaneous CQ Type equations.

5. Type constructor machinery that allows the specification of functionally related conventional types and/or CQ Types and their subtypes or alternatively, simply pairs of conventional types and/or CQ Types that are functionally (but not subtype) related, such that the type/subtype structure (or non-subtype functional relationship) determines the functional relationship of instances of those CQ Type and subtypes and thereby, allows automated redesign (i.e., construction) of one instance from a related instance based on the relationship of their types;

6. A type differencing mechanism to automatically generate redesign transformations where the redesign transformations will redesign an instance of one of the types into the related instance of the other functionally related type; and 7. Type inference rules that are automatically generated when functionally related types are generated by the composite type differencing mechanism.

There are several advantages provided by these mechanisms:

1. A system of simultaneous, parameterized type equations and their associated type difference transformations provide a large grain design relationship that defines a parameterized process for redesigning code from one design context to a different design context where the simultaneously occurring variable parameters impose constraints upon the design that cannot be fully and concretely realized until the concrete context of usage is known, that is, until there exists a programming based specification of the computation. The process of incrementally solving the type equations in the context of the incremental introduction of (i.e., solution for) concrete instances of the types within the type equations and corresponding instances of those types fully automates the realization of the concrete code that is destined for the target design context. The design engineer who created the reusable type equations and one or two elective type difference (i.e., redesign) transformations determined once and for all (i.e., at the time a design framework reusable library was being populated) how the redesign of the eventual application code would happen and did so without ever having to know the concrete details of that application code that would be adapted between design contexts. Such large grain redesign process specification eliminates the need for a human to reprogram the application code for some new design context (e.g., for a new machine with a fundamentally different architecture).

From a slightly different point of view, this invention provides a system for specifying a set of abstract constraints that specify an abstract relationship between two or more different design contexts. And to do so at abstract constraint specification time, without having to know the concrete code level details of the exact computation to be migrated from one or more source contexts into the others contexts. One design context might be a design pattern framework that expresses the elective superstructure of the computation (e.g., a skeletal design for threads cooperating to perform a computation whose specific computational details will only be available later). That is, the framework initially knows very little about the specific computation (e.g., some payload computation that is performing pattern recognition) that will be mapped into this superstructure skeleton.

Importantly, the abstract relationship is not expressed in terms of programming language based abstractions (i.e., descriptions that mirror structural aspects of the computation per se) but rather it is described via type relationships that imply methods and processes that are able to evolve the specific computational details (when they become available) into a form that is coordinated with and will fit properly into the abstract design framework to form a fully integrated computational form that will perform the intended computation. More simply put, the relationship is not comprised of programming language structures or abstractions thereof. The relationship is more like a recipe for manufacturing those programming language structures and abstractions thereof. And that recipe is driven by the abstract relationship.

More concretely stated, the advantage of this ability specify an abstract relationship (separate from the code details) is that it provides is the generational amplification by which an unlimited number of specific instances of similar large grain relationships can be generated for an unlimited number of specific computations using a single set of simultaneous type equations plus a small amount of additional data. Each of those large grain relationships can then be used to generate a custom computation that exploits the common abstract design features and relationships.

This ability to generate a plurality of specific large grain relationships from a single set of type equations and a few other easily determined items leads to the further advantage that these abstract type equations can be incorporated into reusable design frameworks stored in libraries and reused again and again to solve an unlimited number of specific generation problems.

2. The type constructor machinery that produces composite CQ types built of more primitive types allows the expression of types that incorporate information specific to the context of definition (e.g., a payload context or a design framework context) and importantly, information that falls outside of the domain of programming language data types. Furthermore, such composite CQ types also incorporate the functional relationships between the composite CQ type and other types from the same or related contexts, thereby providing an opportunity to automatically redesign an instance of a type in one context to a computationally equivalent but structurally different instance of a type in another context (i.e., the two types have the same computational result but may be expressed differently only because of the context in which they are defined). In such a case, one of the contexts may include additional design features that the other does not and if so, the difference between the types reveals how to re-design the computation instance from the context without the additional design features into an instance in the context with the additional design features. For example, a payload may know an image matrix as the variable B defined in a scope named "scopeP" where its CQ type might be "|(image_:myscope_scopeP)|'". B might be determined to correspond to another version of the image type that is defined in scopeF (i.e., its CQ type would be "|(image_:myscope_scopeF)|". The composite type machinery incorporating context information would allow one to automatically redesign an instance of "B" found in scopeP into the instance "(*(BP rsparms9))" in scopeF by differencing pairs of CQ types in a type chain between type "|(image_:myscope_scopeP)|" and "|(image_:myscope_scopeF)|" and incrementally applying those differences to redesign "B" into "(*(BP rsparms9))". Context information in types along that chain contains problem specific information needed to create the new form, information such as the existence of BP as a field of rsparm9 (i.e., BP is an instance of a related C-style struct type).

3. The automatic generation of type inference rules expressing the relationships between functionally related CQ types allows the new relationships to be automatically dealt with in the course of generation, totally without human intervention. These rules have the same characteristics as the existing type inference rules and because the type inference system of the preferred embodiment is based on inheritance, the new rules can be incorporated at the appropriate points in the type hierarchy and they will shadow similar but more general rules as they should but not trigger when the more general types should apply. Thus the type inference system is automatically extended by the machinery of the invention without the need for any manual intervention.

4. The ARPS system allows the expression of relationships between an entity in one context (e.g., a framework) and a "yet to be defined" entity in some other context (e.g., a payload for the framework). The "yet to be defined" entity is so designated because it may be defined in the future or at a different place or by a different programmer or perhaps some combination of these. Because the ARPS system operates on problem domain specific representations and eschews the programming language representation domain, it can establish connections between two disparate contexts with ease once they are brought together during the process of automatically generating a program. Inferring such connections in a programming language representation domain often involves extensive analysis, deep inference, partial evaluation of code and use of knowledge that is not specifically a part of the specification of the two contexts that a generator is attempting to connect. In the general case, the problem is so difficult in the programming language representation domain that it is often impossible for intelligent, knowledgeable humans with significant supporting material to accomplish it. On the other hand, establishing such connections in a problem domain representation mostly reduces the connection or reference problem to one of navigation through the problem domain objects using simple domain specific properties of the objects being navigated over. The reason for the simplicity is that the problem domain representation comprises elements that have not yet been integrated into programming code representations and are factored into separate and not yet interwoven design features (e.g., a partitioning pattern of the eventual code). Often, those domain representation elements "imply" certain yet-to-be-created features of the code representation but those domain representation elements have not yet been applied, integrated and propagated into a code representation, a representation where explicit domain elements have been converted into hidden but implied information. Said differently, while the programming language representation is prescriptive (i.e., it is an agenda of computational actions), the domain representation is factored into structures of declarative pieces (e.g., goals, data descriptions and constraints) that have yet to be processed into a prescriptive form. And the essence of ARPS expressions comprises finding pieces (e.g., computational goals or data descriptions) and the things that logically restrict or modify them (e.g., constraints). Therefore, ARPS applied to pre-program language representations of a computation converts a problem that is so difficult that it precludes automation when expressed in the programming language domain into a problem that is relatively easy to automate when expressed in the problem domain.

5. The parameters used in parameterized CQ types (aka progenitor types) allow one to defer connections to those parameters until payload integration time. When coupled with the ARPS machinery as a connection binding tool, we have a rough analogy to classical function parameter sequences and the calling machinery that binds actual arguments to those parameters. In this analogy, parameterized CQ types play the role of parameters (to frameworks, in this case) and ARPS plays the role of the parameter binding mechanism. The analogy is not perfect but serves as a guide to understanding the mechanism. Like the parameter/argument system of conventional functions, the parameter variables represented by parameterized CQ types and the ARPS connection mechanism allows separation of parts in time and space while still allowing the eventual integration of those parts to form a tightly integrated result. Overall, this facility combined with the other mechanisms of this invention, provides a higher variability of resultant components constructed from a smaller number of piece parts than a system that starts with piece parts that are expressed in a programming language domain (i.e., in code). This higher variability results from design frameworks being less constrained to a small set of possible payloads because the design frameworks assume very little about the payloads that will instantiate them. Therefore, almost any payload that has certain domain specific properties (e.g., computation of individual cells of a matrix are not dependent on the computation of other cells of the matrix) can instantiate the same design framework thereby providing a combinatorial amplification of the number of resultant components.

BRIEF SUMMARY OF THE INVENTION

This invention addresses the problem of automatically integrating two separately derived pieces of code that are potentially compatible but differ in a few design details that will have to be synchronized to achieve compatibility. This often occurs when one is trying to integrate a specific computation (e.g., a convolution computation on a digital image, such as an edge detection algorithm) with another component (e.g., a pattern for thread based parallel execution of a computation). This is not straightforward since the constraints of these two contexts may not allow straightforward assembly (i.e., the pieces cannot be simply "snapped" together without modification). The convolution code must be split up into pieces each of which is destined to be executed in a thread. Those pieces need to be put into a so-called thread routine whose parameter constraints limit the number of parameters that can be used to send data to the piece of code within the thread routine. Thus, some programmer (or automated generator) is going to have write (or generate) some "glue" code to fix this and that glue code will require redesign of thread code and the structures by which application data is communicated to that thread code.

To accomplish this redesign, this invention defines a new kind of type (i.e., a CQ Type) that can jointly specify elements of the program being built (i.e., programming language data types such as "int" or "float") as well as contextual qualification elements of (or constraints on) the new design that is to be imposed on the code. Importantly, these latter contextual qualification elements specified fall outside of the programming language data type domain in that they may specify design abstractions, design features, elements of and restrictions on the redesign process and so forth. That is, they specify knowledge that cannot be expressed in a programming language or abstractions thereof. They are in a sense "meta" information, information outside of the programming language domain.

The specifications of these CQ Types can contain parameters whose values may not be known until the CQ Types are actually used in the context of a concrete problem, i.e., in the context of concrete code expressions. So, one can defer pinning a CQ type down to be an "int" or a "float," for example, until it is applied to a concrete problem. CQ Types can also express explicit functional relationships among themselves thereby capturing knowledge of computational relationships that may be exploited to re-express pieces of code to fit the constraints of a different context. For example, a digital image "B" in one context (e.g., in a specification) may need to be expressed as "(*(rsparms9.BP))" in a different context (e.g., in a generated thread routine).

Finally, large grain relationships among different computational contexts may be expressed as simultaneous parameterize type equations along with one or more type difference transformations that define how to redesign an instance of one CQ Type into an instance of another not-functionally-related CQ Type. Type equations within a single context capture the inherent relationships between computational forms within that context (e.g., the relationship between B and (& B)) and the type difference transformations capture elective mappings of computational forms between contexts (e.g., a transformation that will carry a pointer to B, that is, the code "(& B)", into the value slot of a field named "BP" within a structure, e.g., "rsparms9," in a different design context). The parameters within the type equations and type difference transformations establish the inter-equation and inter-context constraints. For example, a variable parameter "?PPtrInst" defined in a CQ Type definition and used in a type difference transformation (during the equation solution process) might acquire the value "(& B)" and thereby, cause the code "(& B)" to be entered into the definition of the field named BP.

The process of incrementally solving the type equations in the context of instances of those types incrementally establishes the mapping of piece of code from one context to a different context.

BRIEF DESCRIPTION OF THE SEVERAL VIEWS OF THE DRAWINGS

Drawings

Drawing Figures
FIG. 1 Example of a design synchronization problem
FIG. 1a Type Constructor Specifications (Part 1)
FIG. 1b Type Constructor Specifications (Part 2)
FIG. 1c Type Constructor Specifications (Part 3)
FIG. 1d Computing Device
FIG. 2 Functionally related types, subtypes, instances and redesign transforms
FIG. 3 Specific examples of functionally related types, subtypes, instances and redesign transforms (for a one dimensional array)
FIG. 3a Specific examples of functionally related types, subtypes, instances and redesign transforms (for two dimensional array)
FIG. 4 Conceptual structure of scope specific types, subtypes, instances and redesign transforms
FIG. 5 Types and instances computed by differencing types (for instance B)
FIG. 6 FindOrCreateType routine to construct a composite type from functional relation of more primitive types

KEY REFERENCE NUMERALS IN DRAWINGS

Ref. 1-01: Design framework
Ref. 1-02: Payload of design framework
Ref. 1-03: Hole for payload
Ref. 1-04: Framework data structure definitions with parameters to thread routine
Ref. 1-05: Detailed parameters required by thread routine
Ref. 1-06: Payload data definitions corresponding to detailed parameters required by thread routine
Ref. 1-07: Body of the payload
Ref. 2-01 through 2-06: Redesign transformations
Ref. 2-07 through 2-10: Specific CQ types and their subtypes
Ref. 2-11 through 2-14: Instances of CQ types derived from least specific CQ type (i.e., Ref. 2-07)
Ref. 2-15 through 2-18: Instances of CQ types derived from most specific CQ type (i.e., Ref. 2-10)
Ref. 3-01 through 3-06: Redesign transformations
Ref. 3-07 through 3-10: Types and their subtypes
Ref. 3-11 through 3-18: Instances of types
Ref. 3a-01 through 3a-06: Redesign transformations
Ref. 3a-07 through 3a-10: Types and their subtypes
Ref. 3a-11 through 3a-18: Instances of types
Ref. 4-01 through 4-06: Redesign transformations
Ref. 4-07, 4-08a, and 4-09a: Chain of types and subtypes in the payload scope
Ref. 4-08b through 4-10b: Chain of types and subtypes in the framework scope
Ref. 4-11 through 4-13: Instances from payload incrementally specialized by addition of successive design features
Ref. 4-14 through 4-17: Instances from framework incrementally generalized by addition of inverse design features
Ref. 4-18: Cross link relating type of payload to corresponding type from framework Ref. 5-01*a*, 5-02*a*: Chain of types and their supertypes for instances of B in payload Ref. 5-01*b*, 5-02*b*: Chain of types and their supertypes for analogs of B instances in framework Ref. 5-03: Linking type Ref. 5-04 through 5-06: Mapping an instance B (5-04) in the payload to a composite form (5-06) by adding design features from types Ref. 5-07 through 5-10: Mapping analogs of instances of B in the design context of a framework by extracting design features from types Ref. 5-11 through 5-12: Specializing transformations X1 and X2

Ref. 5-13: Linking transformation X3

Ref. 5-14 through 5-15: Generalizing transformations X4 and X5

Ref. 5-16: Common global type

DETAILED DESCRIPTION OF THE INVENTION

The Problem

Figure 14A:
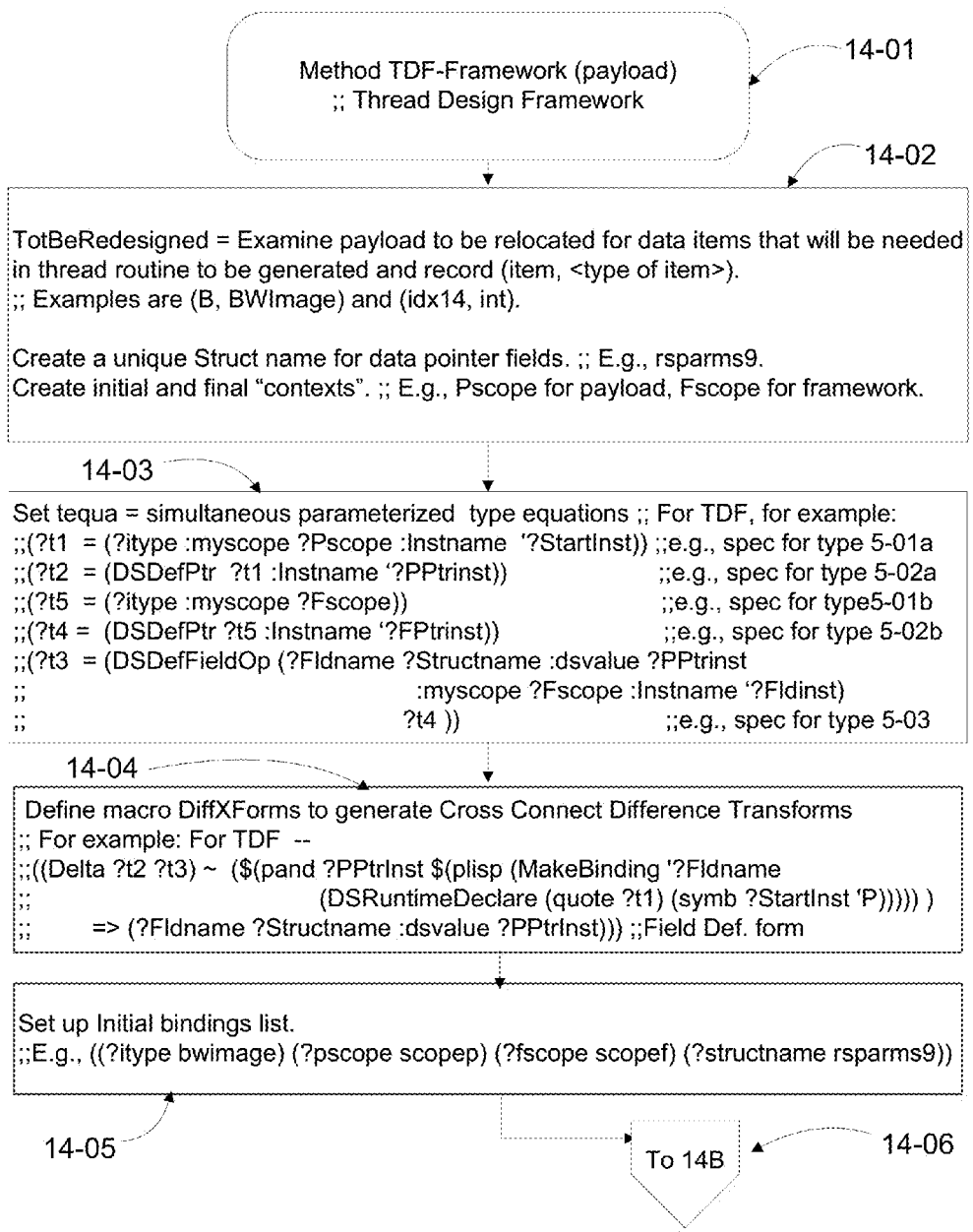
FIG. 14a-b: Example of a Design Framework (the Thread Design Framework, TDF)
Figure 14B:
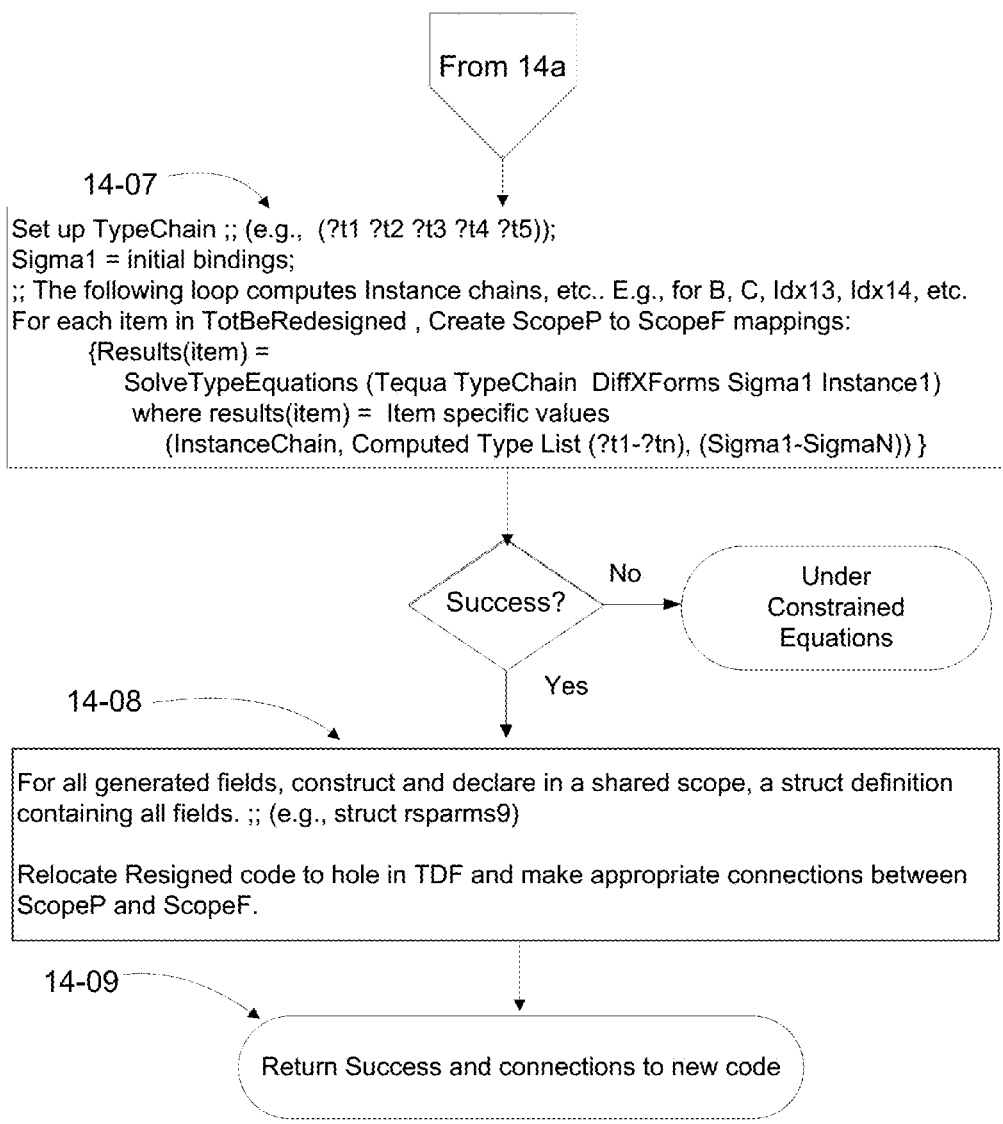

This invention addresses the problem of automatically integrating two separately derived pieces of code that are potentially compatible but differ in a few design details that will have to be synchronized to achieve compatibility. These design differences arise from slightly differing requirements for the differing specifications. For example, consider a code framework (Ref. 1-01) shown in FIG. 1 as one of those pieces of code. It is a combination of skeletal code plus holes (Ref. 1-03) designed to accept insertion of foreign, target computation code. Let's call this framework the "Thread Design Framework" (or TDF) for short. (See FIG. 14*a-b* for an example method defining the essence of the TDF operation.) Let's say that he TDF framework example expresses a pattern of parallel computation using threads to implement parallel execution. (Note: the figure elides the TDF details that are not directly relevant to the specific example we will use). The framework's design might be constrained by the requirements of the thread package used. For example, a required user (or generator) written routine for initiating a thread might only allow one user data parameter to be passed to the application programmer's thread routine (along with the thread specific parameters, of course). If that thread routine requires more than a single item of user data to operate (e.g., input and output matrices, the dimensions of the matrices, and perhaps some start and end indexes specific to the algorithm), then the programmer (or generator) may have to write some kind of "glue" code to connect the target computation code to the holes in TDF. For example, he might setup global variables to communicate that data to the thread routine. Alternatively, the programmer could write some "glue" code to package up the set of needed data into a structure (for example) before calling the thread routine, send a pointer to the structure to the thread routine as the single user argument and then unpack the data items within the application's thread routine. In the structure design case, he will also have to adapt elements of his "vanilla" payload computation to the details of this glue code (i.e., the structure).

Given those requirements on the thread based code framework (TDF), consider the nature of the target code payload (e.g., Ref. 1-02) that is to be merged into TDF. That target computation payload might benefit from parallel computation but will require design modifications to execute correctly with the TDF framework (Ref. 1-01). For example, among the modifications that will have to be made to synchronize it with the code in the TDF framework is the redesign of the references to its data (e.g., the matrices, etc.) so that they synchronize with the design implicit in TDF's (skeletally defined) thread routine (Ref. 1-01). As mentioned earlier, using direct references via global variables to the matrices and related data (e.g., indexes) is one possible solution but that may require some scope adaptation to both the payload the framework to allow sharing of the same scope. Such changes can be daunting for an automatic generation system because generator has to first model the global scoping structure, which can be challenging. If the framework design cannot be changed (e.g., it is a reusable library component or it calls unchangeable library routines), then the design of the payload will have to be altered by writing some glue code that packages up references to the payload variables and modifies the payload code to connect through the glue code. The glue code option has the benefit of greater localization of the changes thereby making them easier for an automated generation system. This invention provides an automated method for redesign code of either case as well as other cases we can envision. For concreteness, the class of redesign process that this example will focus on is the one that allows the payload code to be redesigned so that it can be relocated into the context of a framework (e.g., TDF) and communicate the require data to the framework context via glue code using a generated struct. (See FIG. 14 for an example method defining the essence of the TDF operation.)

To create the redesign machinery, this work extends the conventional notion of data types by incorporating into the type specification design features and contexts that fall outside the domain of programming language data types (e.g., generator-time design features). Thereby the generator is able to define and work directly with features and contexts of an evolving design abstraction (i.e., one not based on programming language structures or abstractions). The extended types are called Context Qualified Types or CQ Types. Additionally, the machinery provides a key mechanism for defining these types as composite types such that there is an explicit functional relationship between some CQ Types and other CQ Types as well as between programming language data types (e.g., BWImage) and related CQ types (i.e. a pointer to BWImage). This explicit functional relationship determines how to automatically generate type difference transformations that can convert an instance (e.g., "B" as in Ref. 1-06) of one of the CQ types (e.g., BWImage) into an instance (e.g., "(& B)") of the other CQ type (e.g., Pointer to BWImage), where "&" is the "address" operator. Also, any two functionally related CQ Types allow the automatic generation of an inverse transformation. The inverse transform will convert an instance of a pointer to a BWImage (e.g., "BP") into the BWImage pointed to by BP (e.g., "(*BP)"). BP might be within a different scope altogether from B (e.g., the *BP in the framework scope shown as Ref. 1-05). The automatically generated type difference transformations as a class are called redesign transformations or redesigners for short. This machinery will be used to redesign instances of generated code (e.g., an expression to compute a convolution of an image) so that they can be used to instantiate a partially complete code framework (i.e., a pattern of some code and some receptacles for foreign code). Since the framework may need to use data items that are decorated with design features (e.g., a field containing a pointer to the data) that are not a part of the original data item, the original data item will need to be redesigned in the code expression to synchronize with the requirements of the framework before it can be used in a context of the framework.

(Note: Some difference transformations are not "pure" functions and may therefore introduce existential variables. For example, an instance of a 2D matrix being transformed into a reference to an item in that matrix may introduce one or more programming language index variables such as ?Idx1 and ?Idx2 whose eventual target program identities (e.g., i and j) may not yet be determined. The mechanisms for dealing with such existential variables and their bindings are somewhat tangential to the direct focus of this application but suffice it to say, the preferred embodiment, DSLGen, deals with these problems using domain specific knowledge (see the discussion of the ARPS protocol below) to stand in for those identities until they can be concretely determined later in the generation process. Later in this application, a method of using design driven instantiation of these existential variables will be described, which by the way, vastly simplifies the problem of instantiating existential variables over more conventional techniques.)

A key problem in using code components developed independently in one context (i.e., one scope) without knowledge of their potential use in and connections to elements of a disparate context (i.e., another scope) is that there is no feasible way to connect the elements of the one context (e.g., a payload context) to the conceptually corresponding elements of the other context (e.g., a framework context) without negating the independence of the two contexts and thereby negating the combinatorial value of pairing many independent contexts. Identifying the correspondences between disparate code components by explicit names is not feasible because the two contexts are developed independently and likely, at different times. Parameter connections are not feasible because like explicit naming, this would require some a priori coordination of the structure of the two disparate code components, which is not desirable. What the two contexts may know about each other is indirect. It is their domain specific entities, features and topology, which opens the door to a reference protocol that is based on one context searching for known or expected domain specific entities, features and relationships within the other context. This is a key mechanism of this invention. It provides the machinery for expressing "anaphoric" references (i.e., references that are implied) in one code entity (e.g., the framework) to data items (e.g., an image data item that is being used as the output data item for a computation) in a separate, disparate and as yet undefined code entity (e.g., a computational payload to be used within the u) framework). This mechanism is called the Anaphoric Reference Protocol for Synchronization (ARPS). The anaphoric reference mechanism expresses references in terms of semantic (and largely domain specific) abstractions rather than in programming language structural forms or patterns (e.g., loops, code blocks, operators, etc.) or abstractions thereof. For example, a structure field within a framework may need a value from some as yet to be defined computational payload. Semantically, the framework knows only that that value will be an image that is being used as the input image of the payload computation. ARPS provides a domain specific notation whereby that relationship can be expressed in the definition of the field within the framework. ARPS provides machinery such that when a candidate computational payload is eventually identified, that ARPS reference will be used like a search query and will automatically resolve to the specific data item needed by the framework.

Once the ARPS expressions in a framework determine the conceptually corresponding items in the payload, the automated redesigners are invoked to redesign those payload items so that they are consistent with the framework design. Then the payload code (suitably redesigned to synchronize with the framework design) can be directly inserted into the holes of the framework.

CQ Types, their Relationships and Type Differencing

A CQ type is a programming language type (e.g., a grayscale image matrix type, say "BWImage") that has additional Qualifying Properties specific to the context of generation (e.g., a design feature, such as the payload scope "ScopeP"). CQ Types allow the generator to express concepts that transcend the strictly programming language type domain. That is, the CQ type concepts include generation entities, contexts and operations rather than being strictly limited to programming language entities, contexts and operations. Also, a CQ type is designed to have an explicit functional relationship to other CQ types. FIGS. 1a-c provide the speciation forms used to define CQ Types. (Note: FIGS. 1a-c of this specification slightly modify the definitions in FIGS. 1a-c of U.S. Pat. No. 8,713,515 by making them more uniform, extending programming language types to optionally allow context qualifiers (in addition to the already allowed programming data type qualifiers), and simplifying the preferred embodiment implementation format of the CQ Type names by replacing functionally related (i.e., embedded) type names with the tag names of those functionally related types. These slight modifications simplified, generalized and extended the capability of the preferred embodiment DSLGen.

Figure 6:
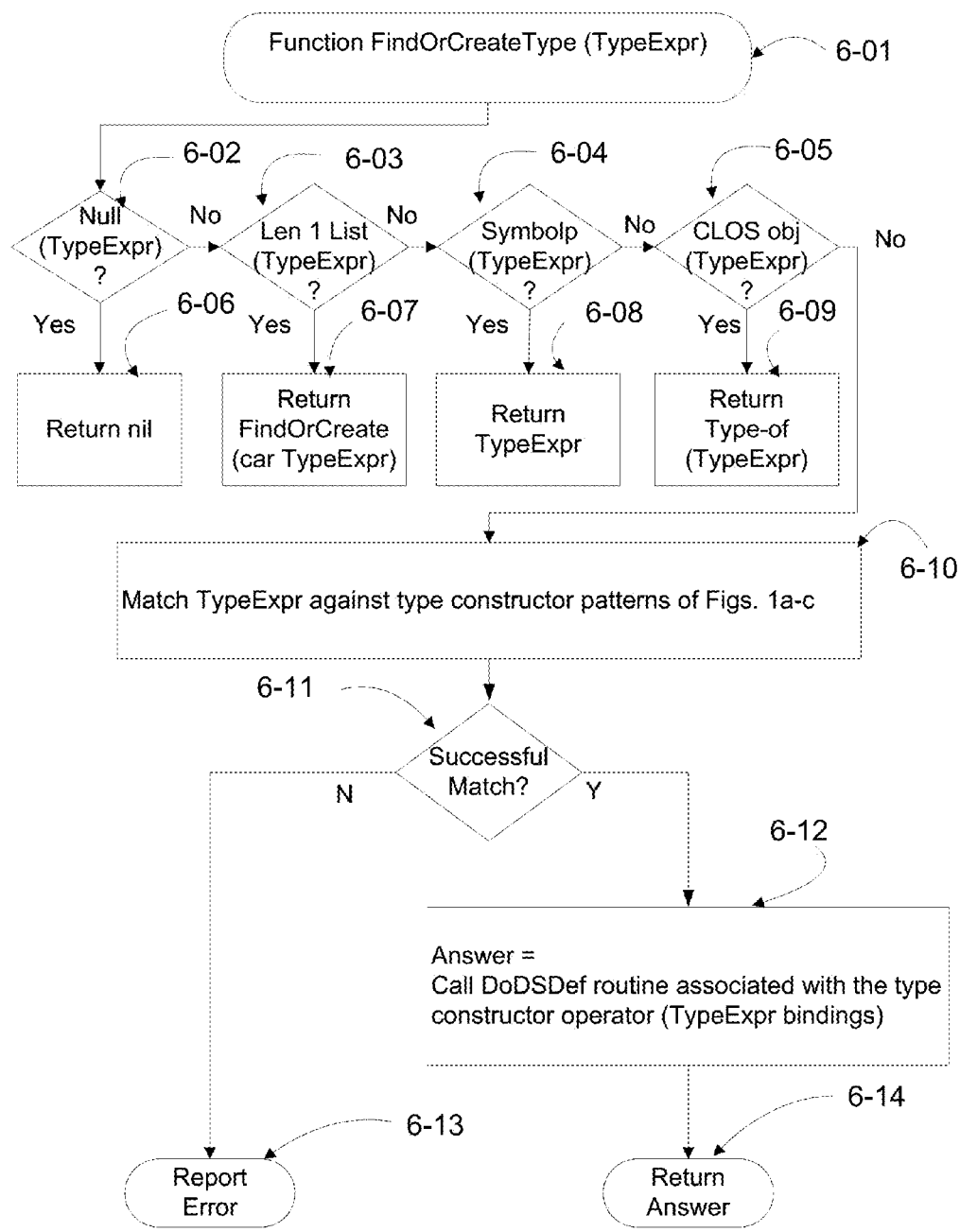
Figure 7:
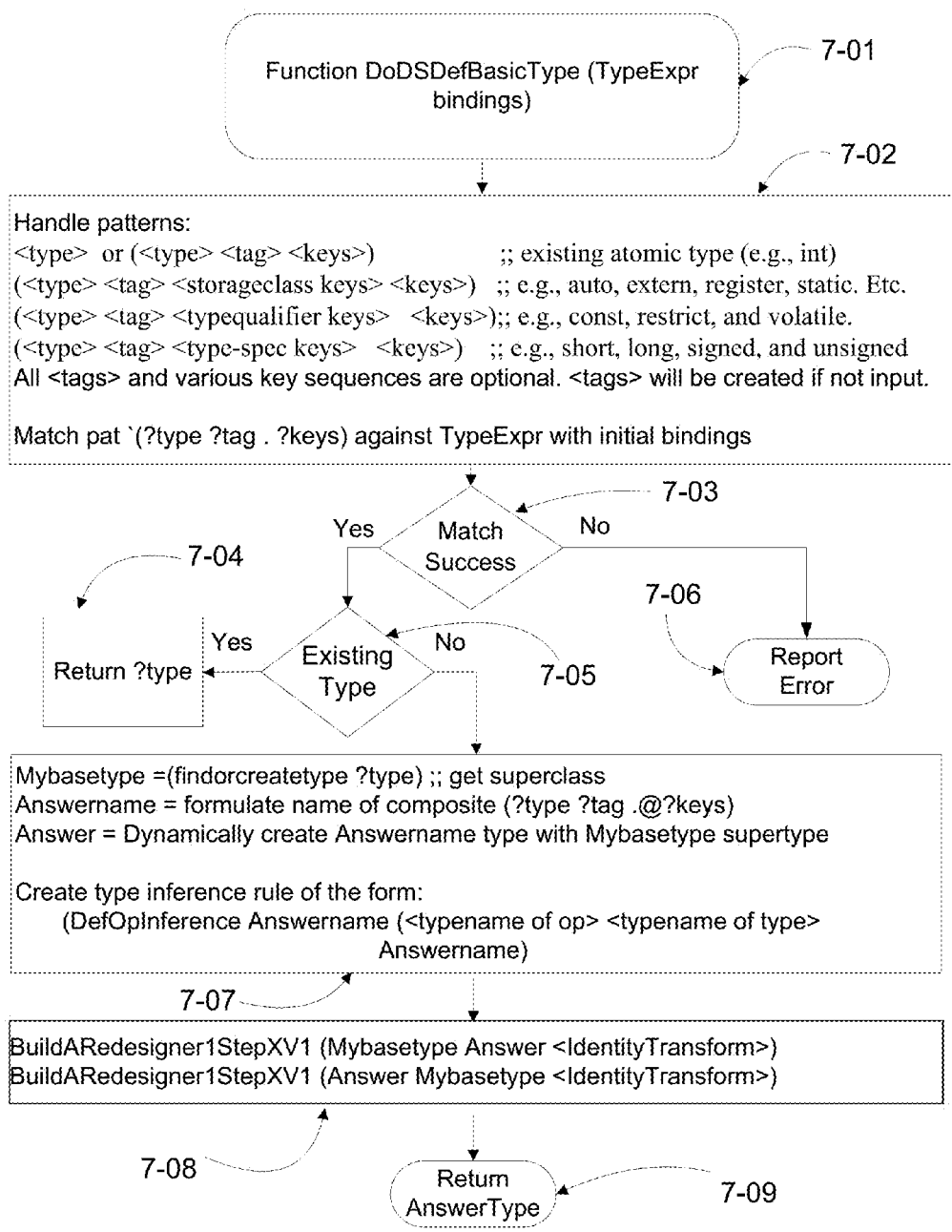
FIG. 7: DoDSDefBasicType routine to construct atomic and modified types
Figure 8:
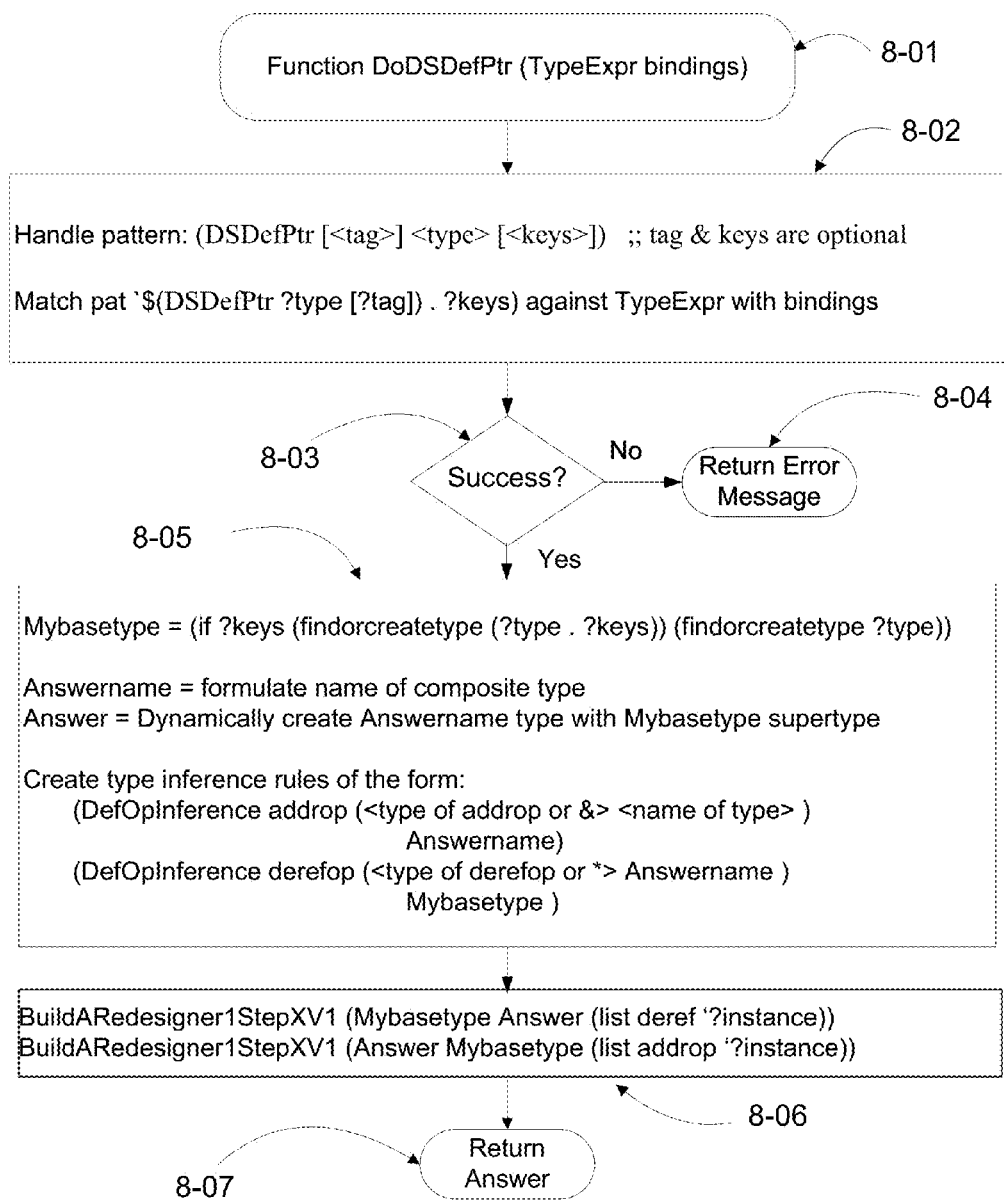
FIG. 8: DoDSDefPtr routine to construct a DSDefPtr related composite type
Figure 9:
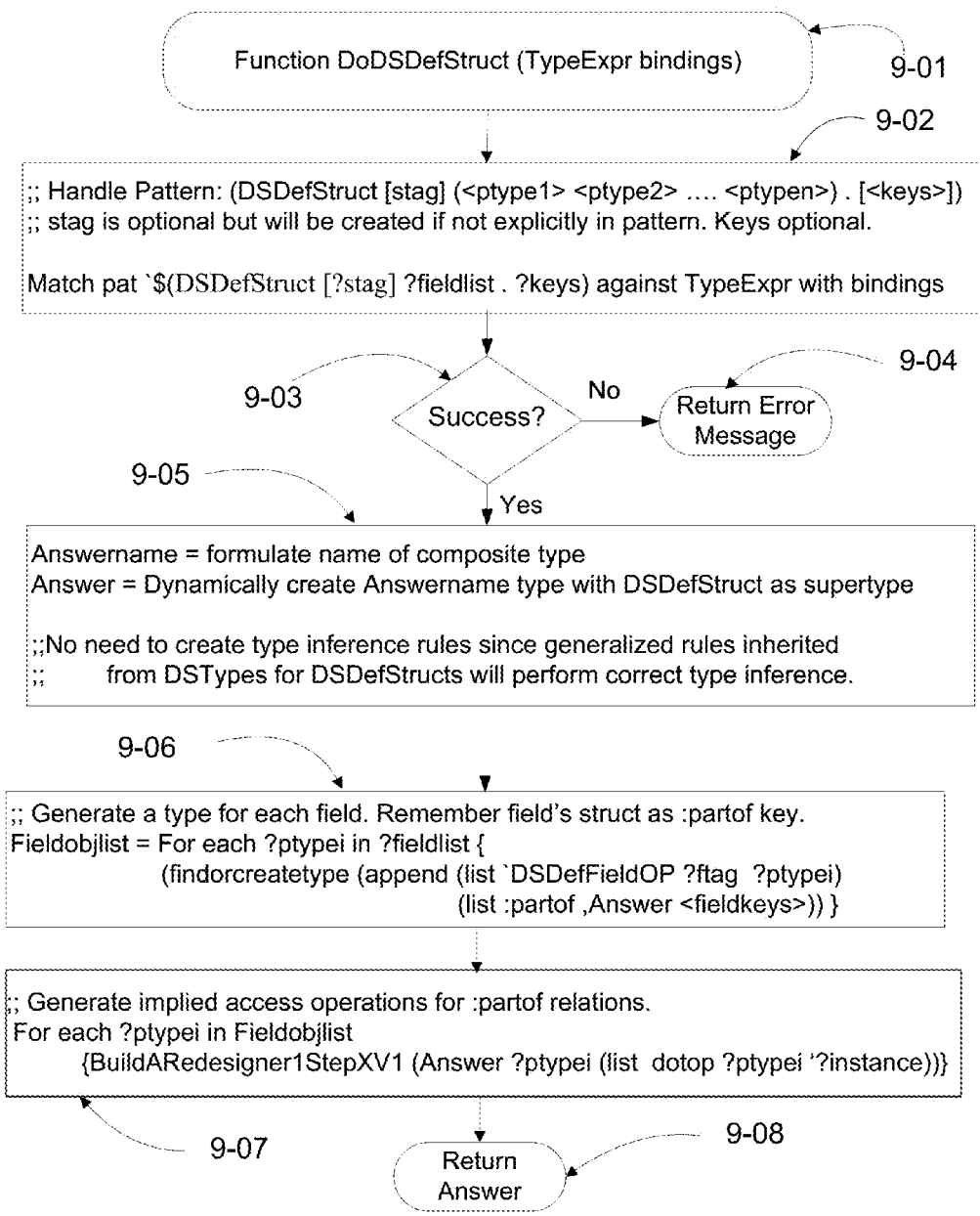
FIG. 9: DoDSDefStruct routine to construct a DSDefStruct related composite type
Figure 10:
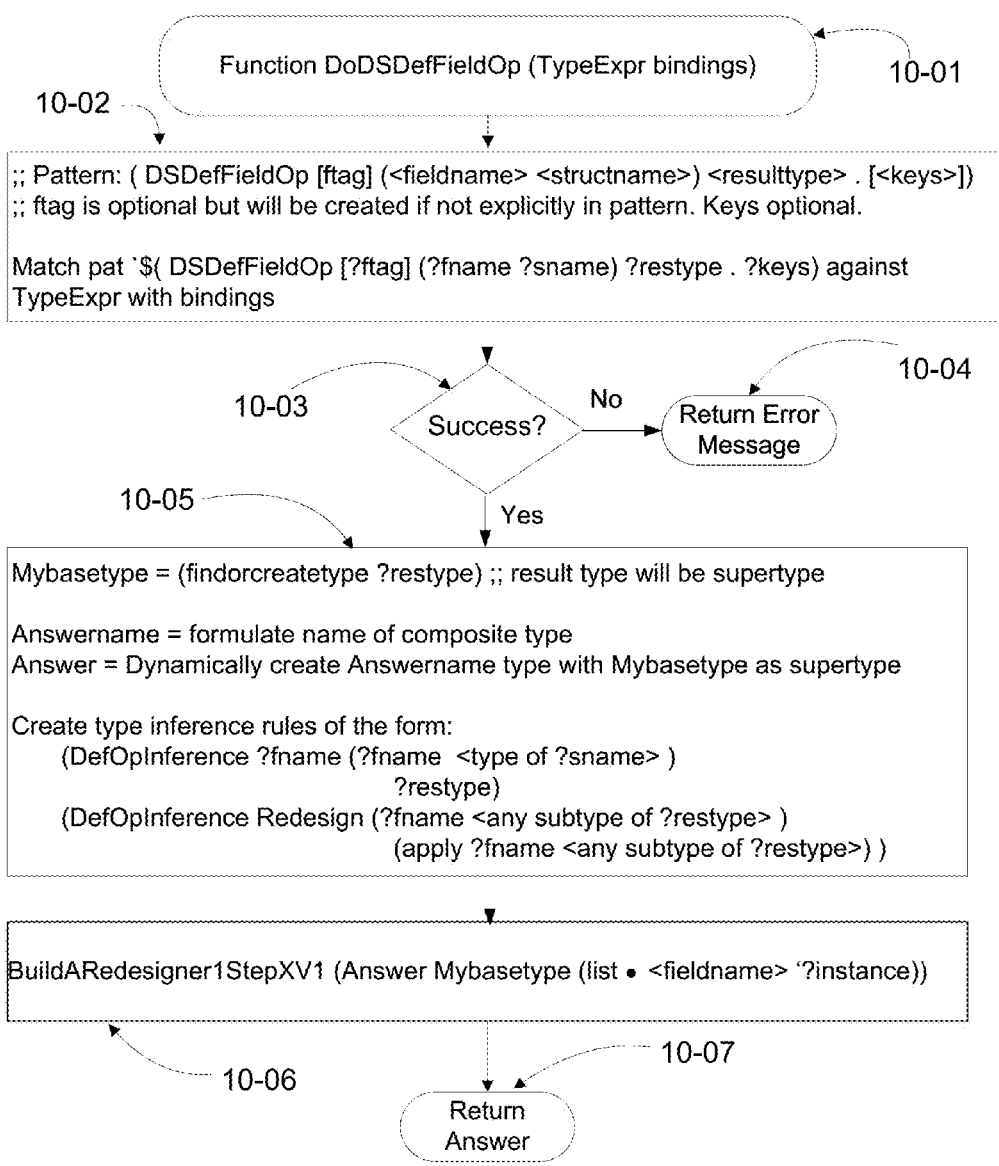
FIG. 10: DoDSDefFieldOp routine to construct a DSDefFieldOp related composite type

FIGS. 6-10 specify: 1) the routine that is invoked to create a CQ Type (FIG. 6) and 2) the routines that FIG. 6 calls (FIGS. 7-10) to actually create the specific type and perform additional necessary operations. These additional operations include creating type inference rules for the new type and creating type difference transformations. The preferred embodiment includes a number of other constructor routines that support the type specifications of FIGS. 1a-c but these are omitted from this specification because they provide no new mechanism over and above that included here. All of these other constructor functions use the invented machinery used in FIGS. 7-10 in ways similar to the functions included here. One skilled in the art should be able to easily apply the invention to those cases without the need to invent any new machinery. Similarly, additional type creation routines may be defined by the user but they will all follow the abstract pattern of operation illustrated in FIGS. 7-10 and will not require any new, novel machinery over and above that provided by this invention.

Figure 2:
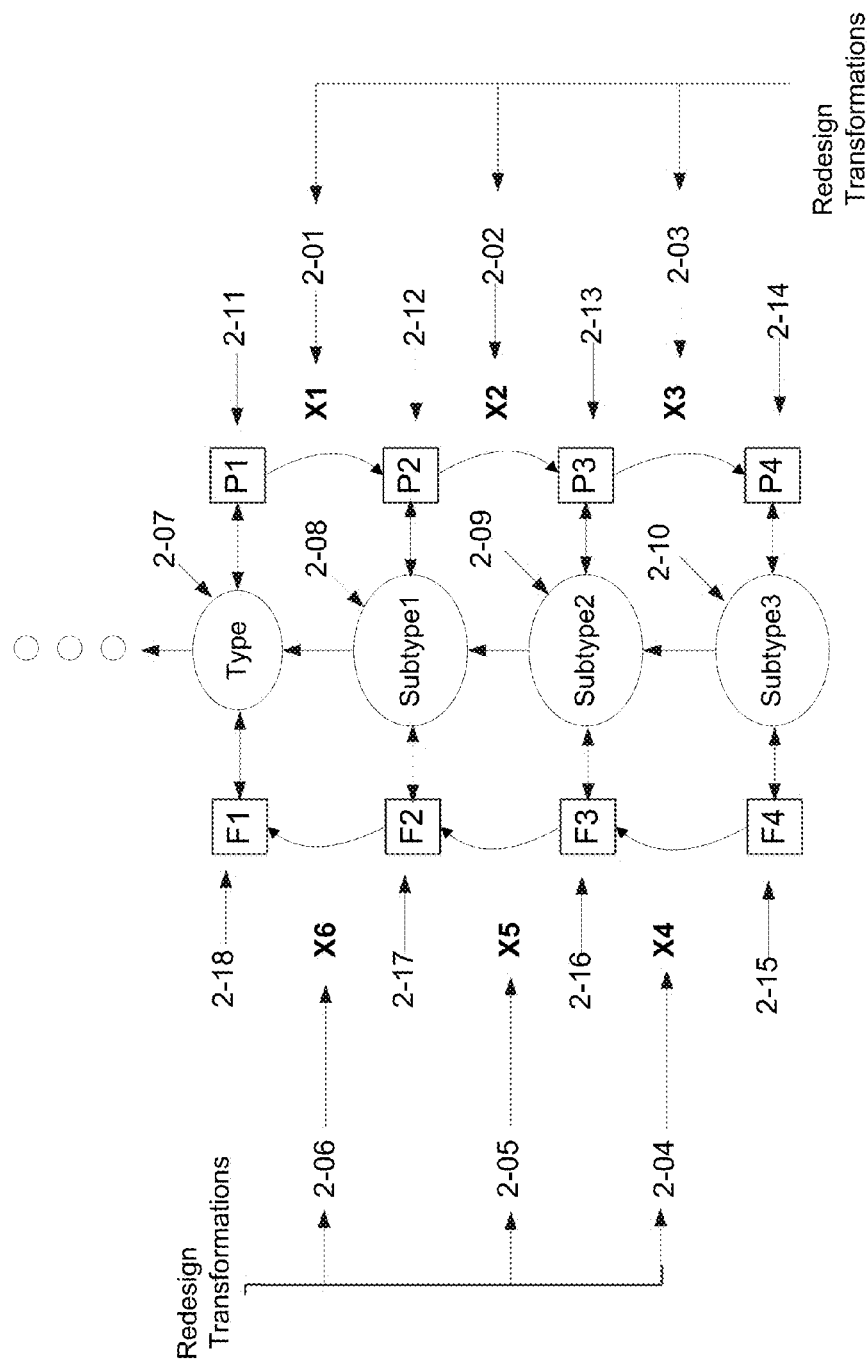
Figure 3:
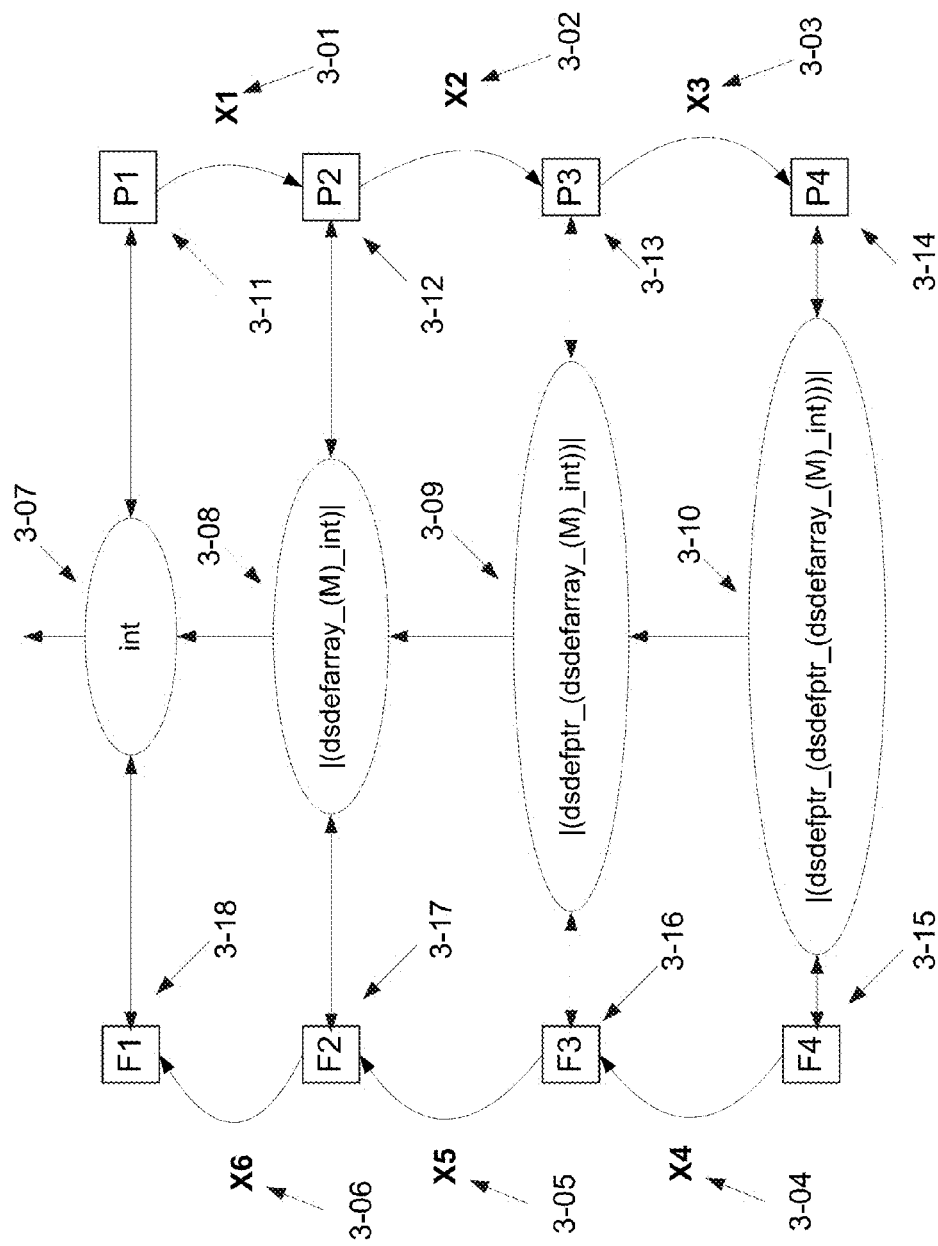
Figure 3A:
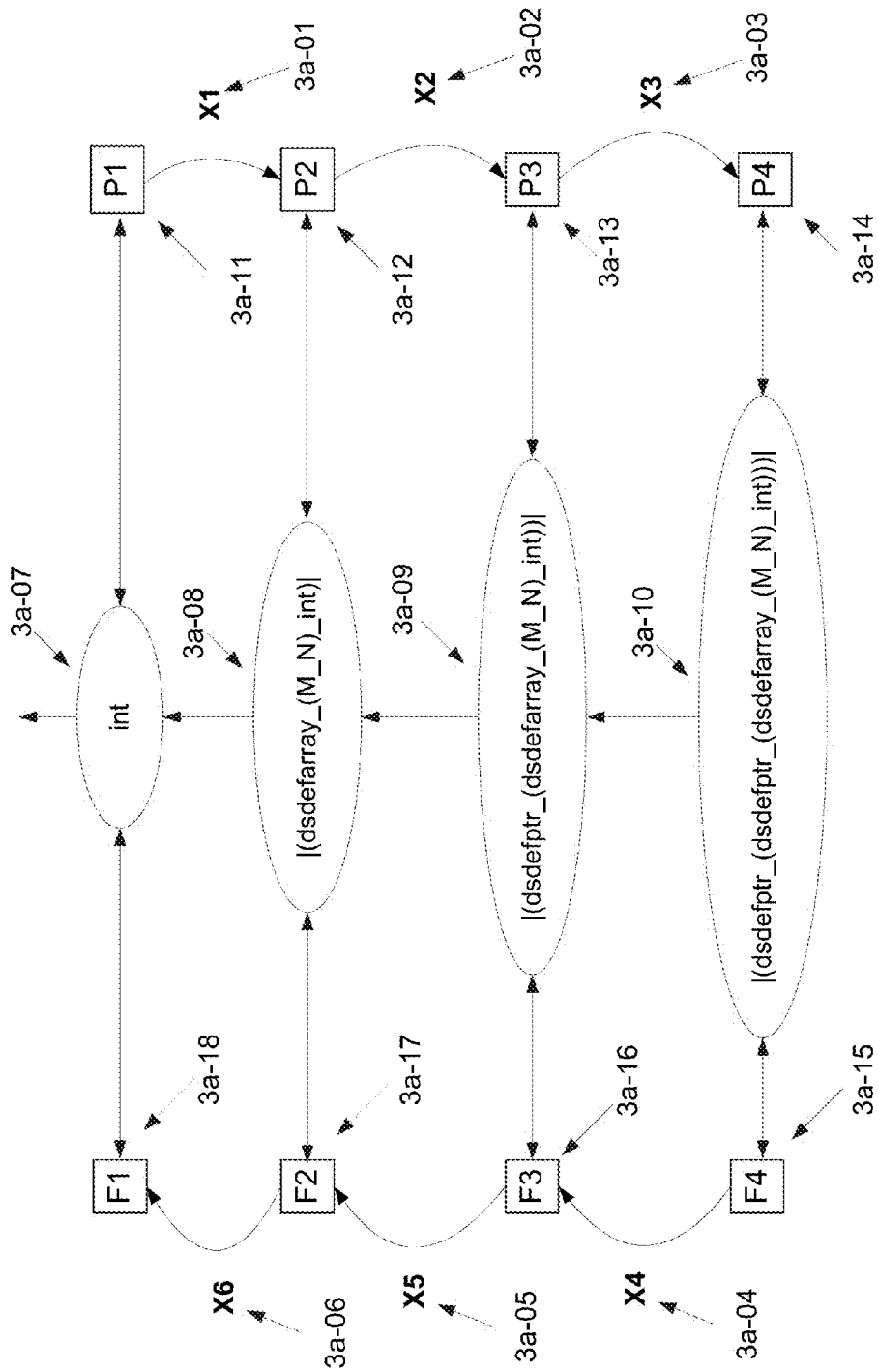

Let us now consider how CQ Types are used to redesign payload code so that it can be relocated to a design framework from a reusable library. FIG. 2 illustrates (abstractly) the relationship between CQ Type/subtype chains, instances of those CQ Types and their associated redesign transformations. In FIG. 2 (and subsequent figures), the CQ Types are shown as ovals and the instances of those types as rectangles. The vertical arrows between CQ Types represent subtype/supertype relationships. The point of this figure is that if the CQ Types (Refs. 2-07 thru 2-10) are known and defined, and one instance such as P1 (Ref. 2-11) is also known then the Redesign transformation X1 (Ref. 2-01) is determined by CQ Types 2-07 and 2-08. Therefore, P2 (Ref. 2-12) can be computed by applying transformation X1 to P1. FIGS. 3 and 3a illustrate examples in more concrete terms. They illustrate these various relationships in terms of concrete CQ Types composed of array and pointer constituents. Thus, these CQ Types imply that F3=(deref F4), F2=(deref F3), and so forth, where F3 and F4 are represented respectively by Refs. 3-16 and 3-15. The other direction (i.e., P1 to P2, etc.) is a longer discussion in that it introduces one or more existential variables (e.g., one or more index variables for the array P2) that are handled by mechanisms that are orthogonal to the focus of this invention. Therefore, that discussion will be deferred so that we do not interrupt the flow of central machinery of this invention.

Figure 4:
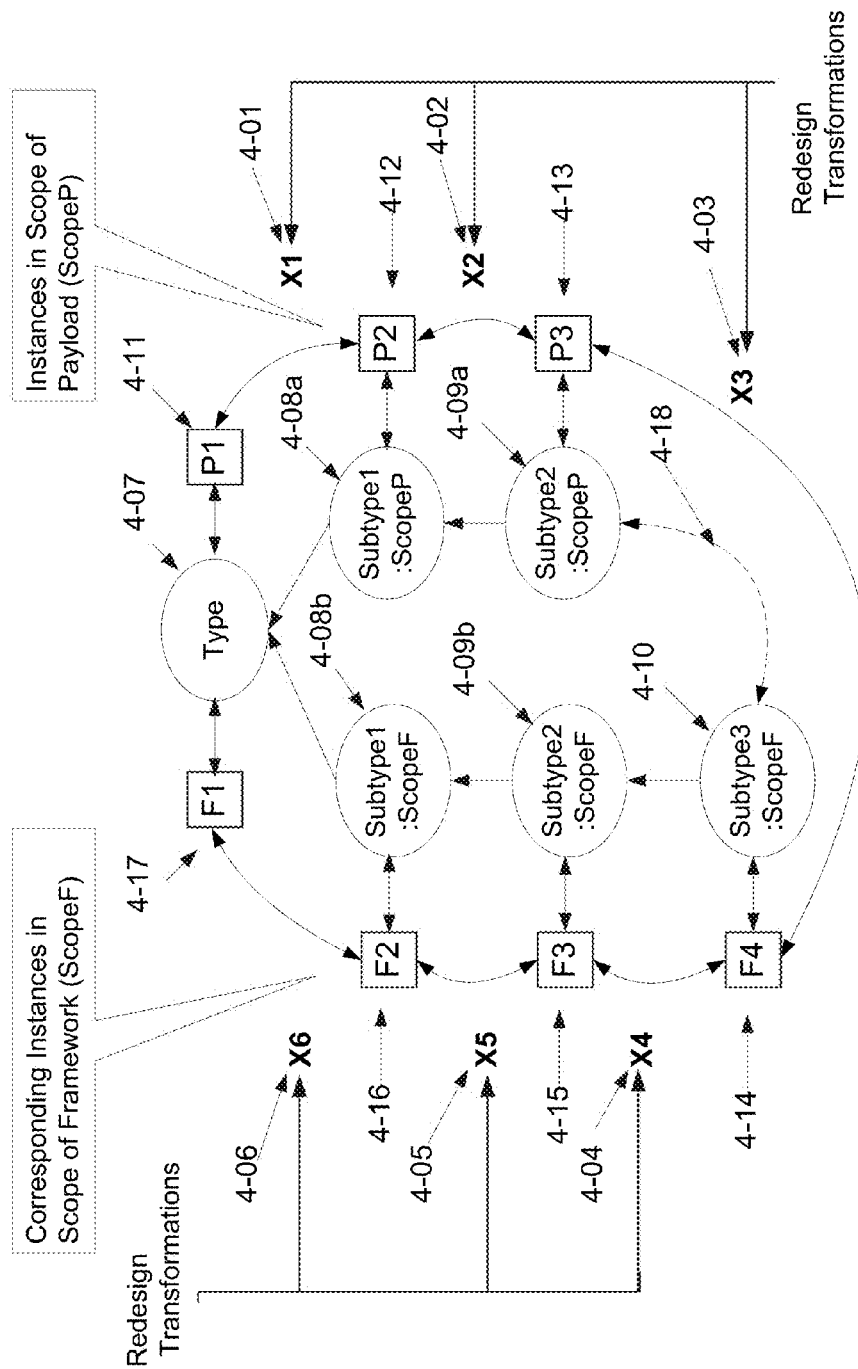

FIG. 4 extends these ideas to show (again, abstractly) how such large grain relationship structures are applied to relate abstract design contexts, in this case, a framework scope and a payload scope. These design contexts, which are designated as "scopes," are just convenient abstractions for the generator to use in the course of formulating the eventual target program but at this stage these scopes have no direct or guaranteed relation to the scope structure of the code that will eventually be generated. They may or may not map into concrete programming language scopes. FIG. 4 shows the conceptual form of relationships between a programming language type (Ref. 4-07) and a number of abstract CQ Types (Refs. 4-08a through 4-10), where the CQ non-programming language domain property for this example is the name of a payload or framework scope (e.g., ScopeP or ScopeF). As earlier, CQ Types are shown as ovals and instances of those types as rectangles. The type to type relationships are implemented via either subtype/supertype relationships (e.g., Refs. 4-08a and 4-09a) or a cross context mapping relationship (Ref. 4-18) that defines some arbitrary transformational mapping between (in the example) an instance of the payload context and a functionally related instance in the framework context. The transformations (i.e., type differences) between instances of CQ subtypes and supertypes (e.g., X1, X2, X4, X5 and X6) are automatically derived from the two CQ types. Cross context mapping transforms (i.e., those between CQ Types that do not have a subtype or supertype interrelationship, which in this example is X3) are arbitrary and therefore are custom written by a design engineer at the time the related design framework (e.g., TDF) is created. They are designed once for a specific reusable design framework (e.g., TDF) but will be used many times to generate many (and potentially an infinite number of) different concrete, target programs and target program parts. In the example of this specification, the mapping relationship is computational equivalence between the end points of the type chain (i.e., between instance P2 and instance F2). That is, execution of the initial computational form (P2) in the payload scope will produce the same result as the execution of a different but operationally equivalent computational form (F2) in the framework scope. At the granularity of FIG. 4, F1 and F2 are essentially the same computational form. And so are P1 and P2. In the preferred embodiment, there are some underlying bookkeeping differences between F1 and F2, and between P1 and P2 but for expository purposes, these machinations can be safely ignored without loss of understanding the novel elements of the invention.

Figure 11:
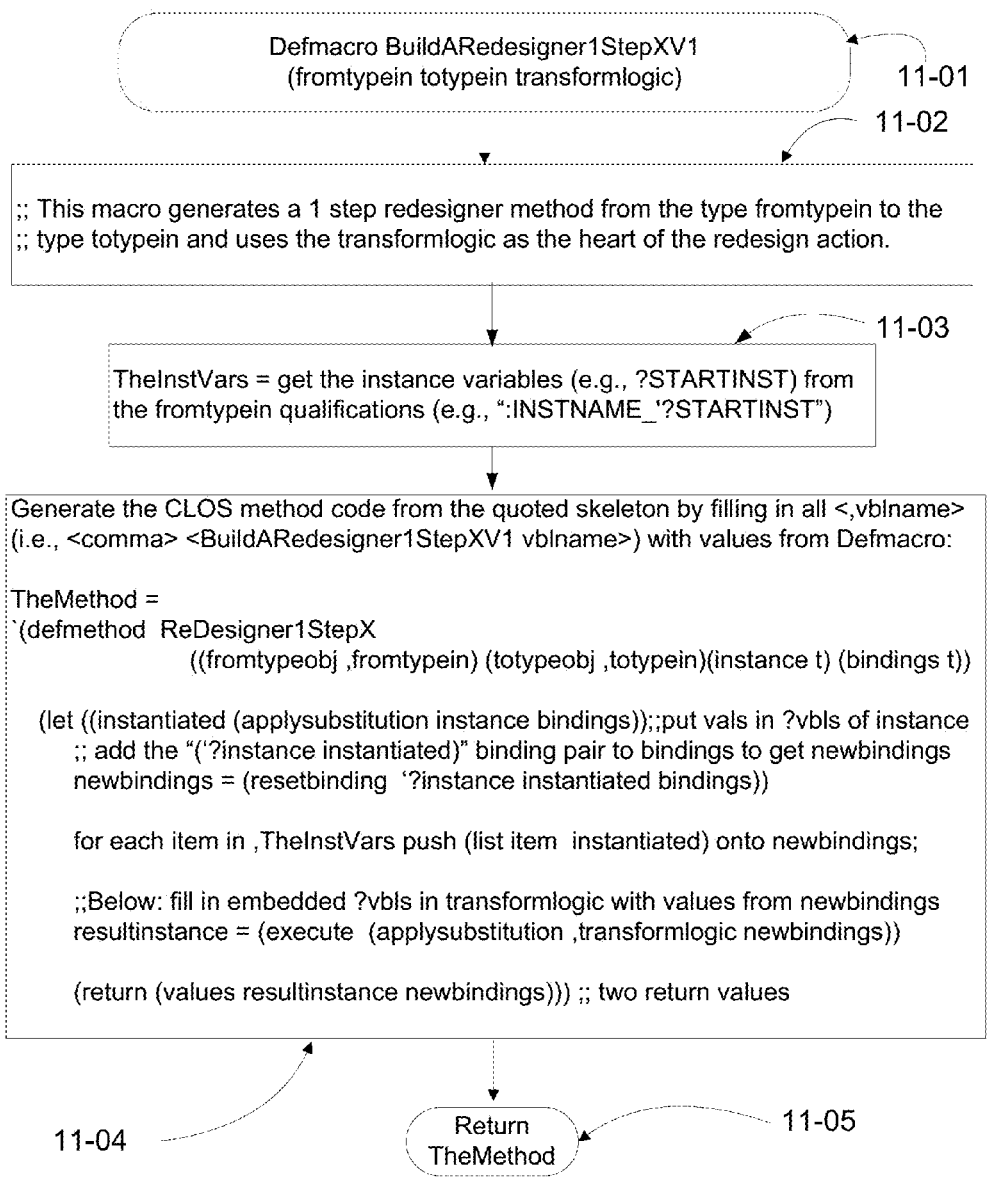
FIG. 11: BuildARedesigner1StepXV1 macro that generates a ReDesigner1StepX method
Figure 12:
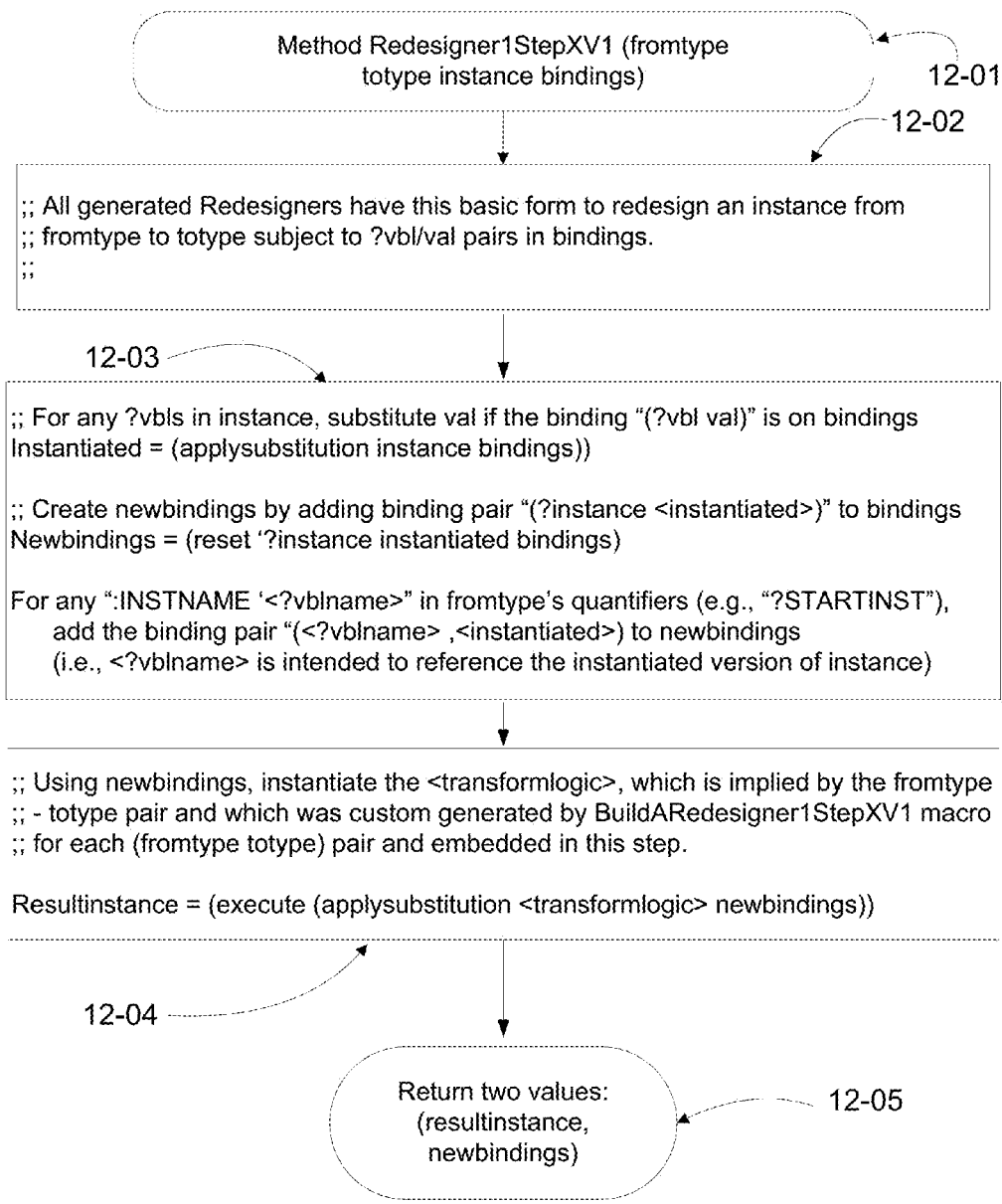
FIG. 12: Redesigner1StepXV1 method, which is an illustrative model for all generated ReDesigner1StepX methods
Figure 13:
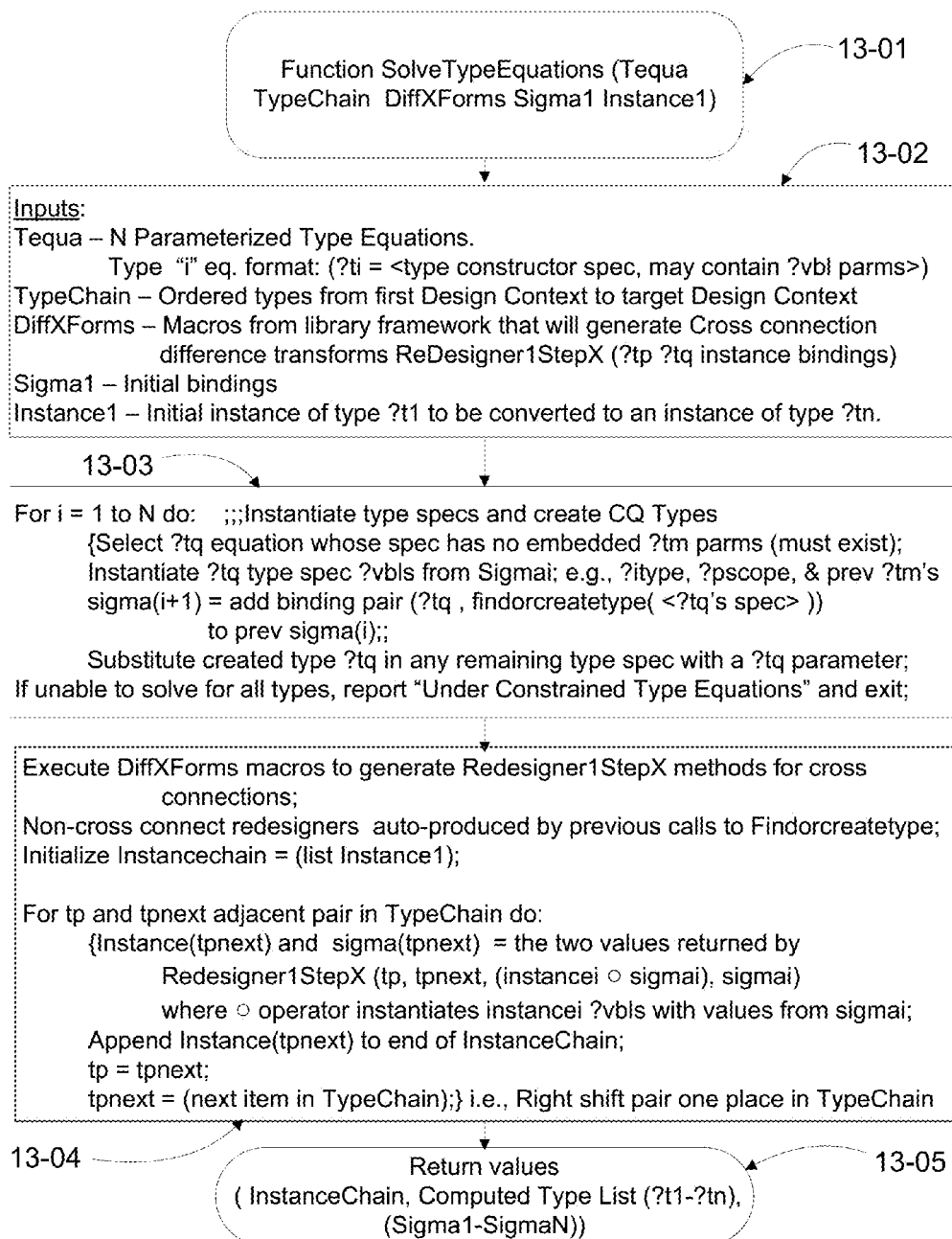
FIG. 13: SolveTypeEquations function that solves simultaneous type equations and also generates type difference methods and the instances of created types

Furthermore, each pair of connected CQ Types (i.e., type/supertype or cross connection) implies two, directionally specific Redesign Transformations that will convert an instance of one of the types into a instance of the other that is one step farther along on the path to computational equivalence. The type/subtype transformations are automatically derivable via so called type differencing operations. The form of the type differencing transformations is deterministically implied by the type constructor operators. BuildARedesigner1StepXV1 (FIG. 11) is the macro that manufactures the ReDesign transformations (which are CLOS—CommonLisp Object System—methods in the preferred embodiment). BuildARedesigner1StepXV1 is called from the functions of FIGS. 7-10. FIG. 12 illustrates an (abstract) prototype of a method manufactured by BuildARedesigner1StepXV1. The CLOS method based implementation allows the CLOS method system to do much of the work of finding the correct transformation for any two types. Any additional pattern matching within an instance of FIG. 12 is generated inline and is quite rudimentary, which is sufficient for the machinery described herein. However, in anticipation of future needs for more powerful pattern matching facilities, the preferred embodiment includes a second parallel implementation that uses full blown transformations instead of CLOS methods. After experimentation with the two methods, the CLOS method is winning out at the moment based on simplicity and sufficiency for current problems. Both implementation fully capture the novel elements of this invention.

By contrast to automatically generated ReDesigners, cross connection transforms are custom created by a domain engineer because they can be arbitrary mappings between non-functionally related CQ Types. Their implementations introduce elective (not determined) design features. Example cross context mappings include, computational equivalence (as in the example presented), data type casts, translation options, etc. Because a complete set of CQ Type relationships (CQ Type to type generated plus user defined) provide explicit functional relationships, the generator can use type differencing to harvest a set of Redesign Transformations (i.e., transformations X1 through X5 in FIG. 4) that carry a payload instance P1 of a programming language type used in the payload context into a computationally equivalent instance F1 of a type used in the framework context. X1 and X6 map between the domain of programming language data types and the CQ Types with the design domain.

Figure 1:
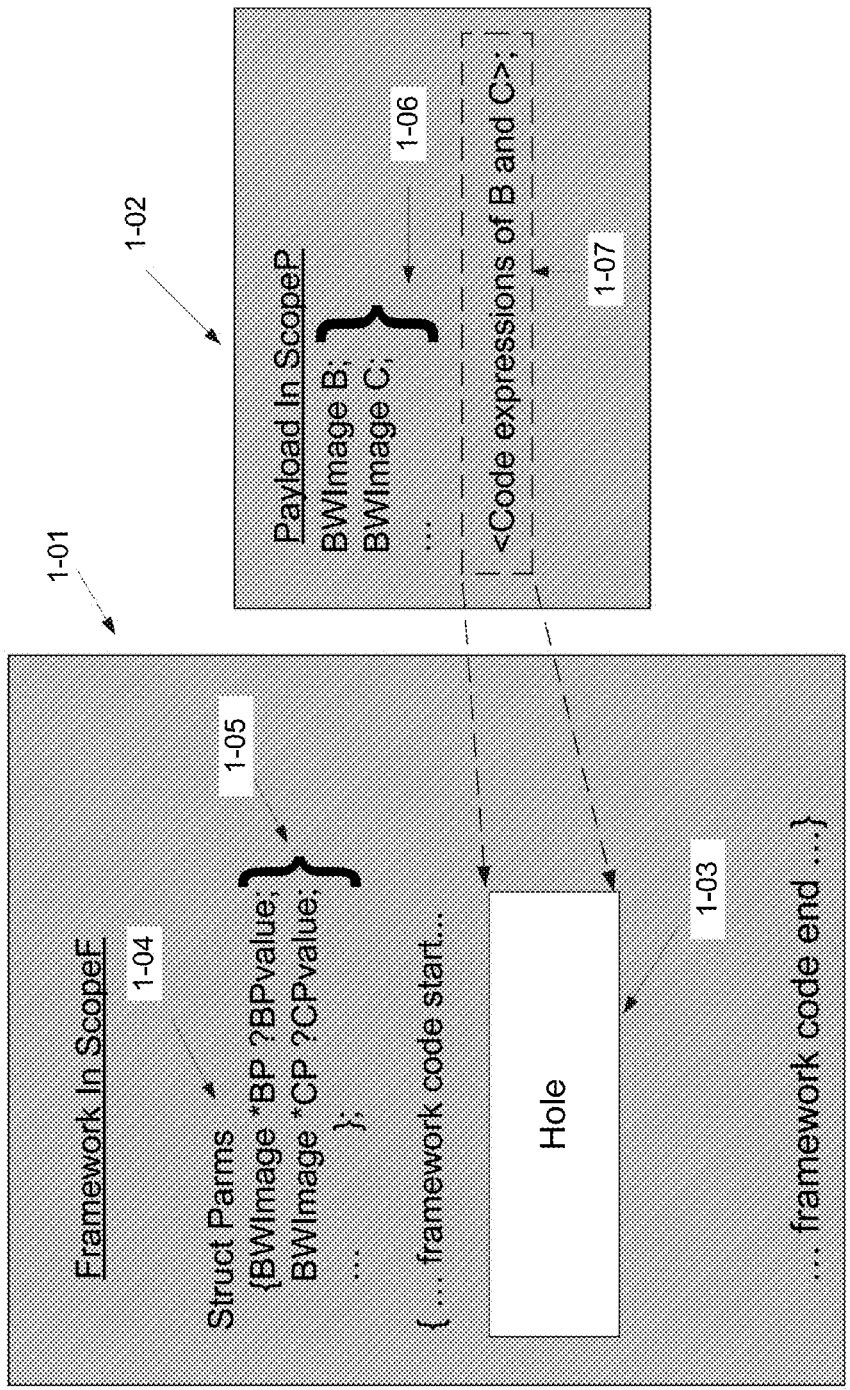
Figure 1D:
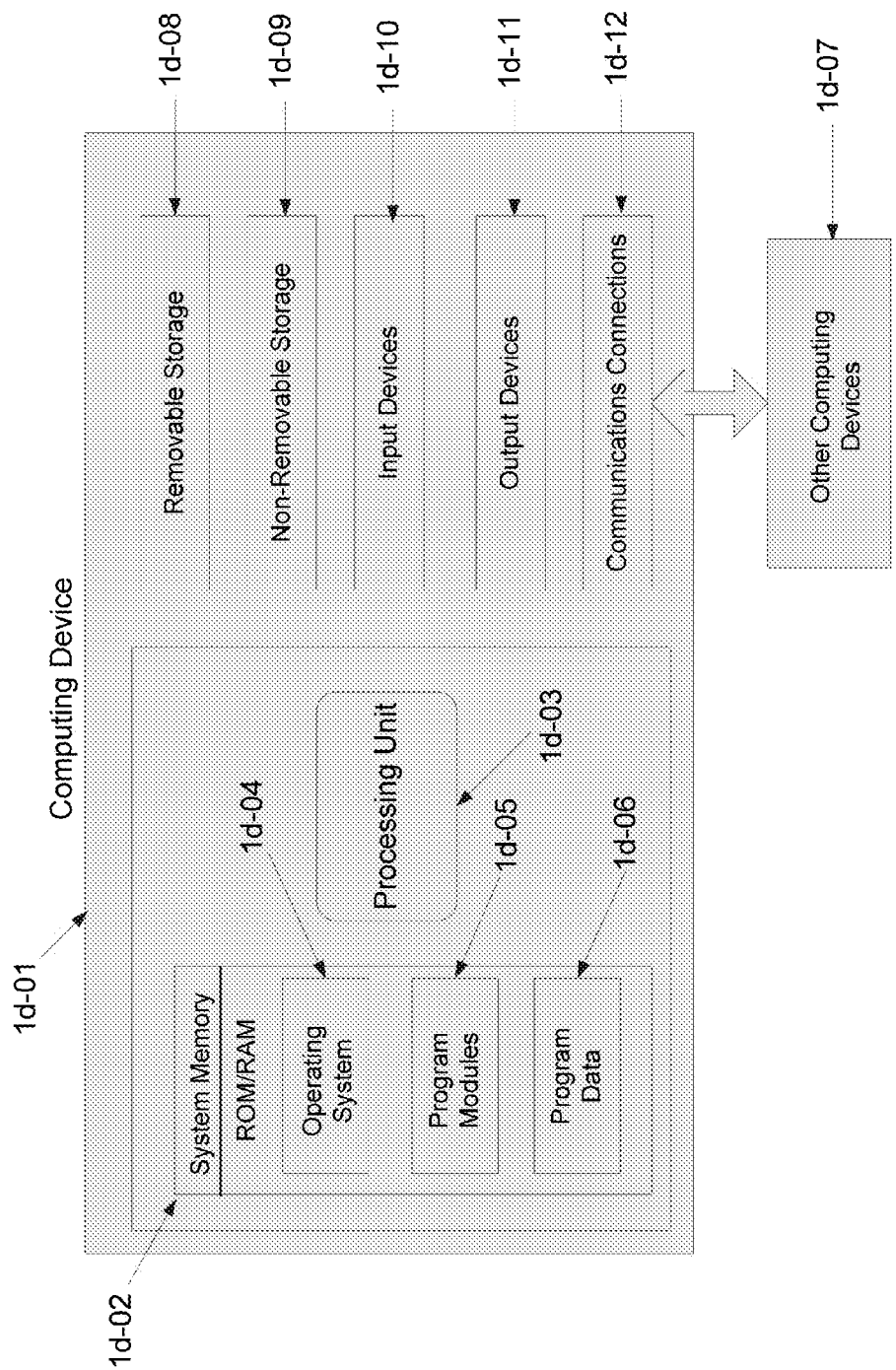
Figure 5:
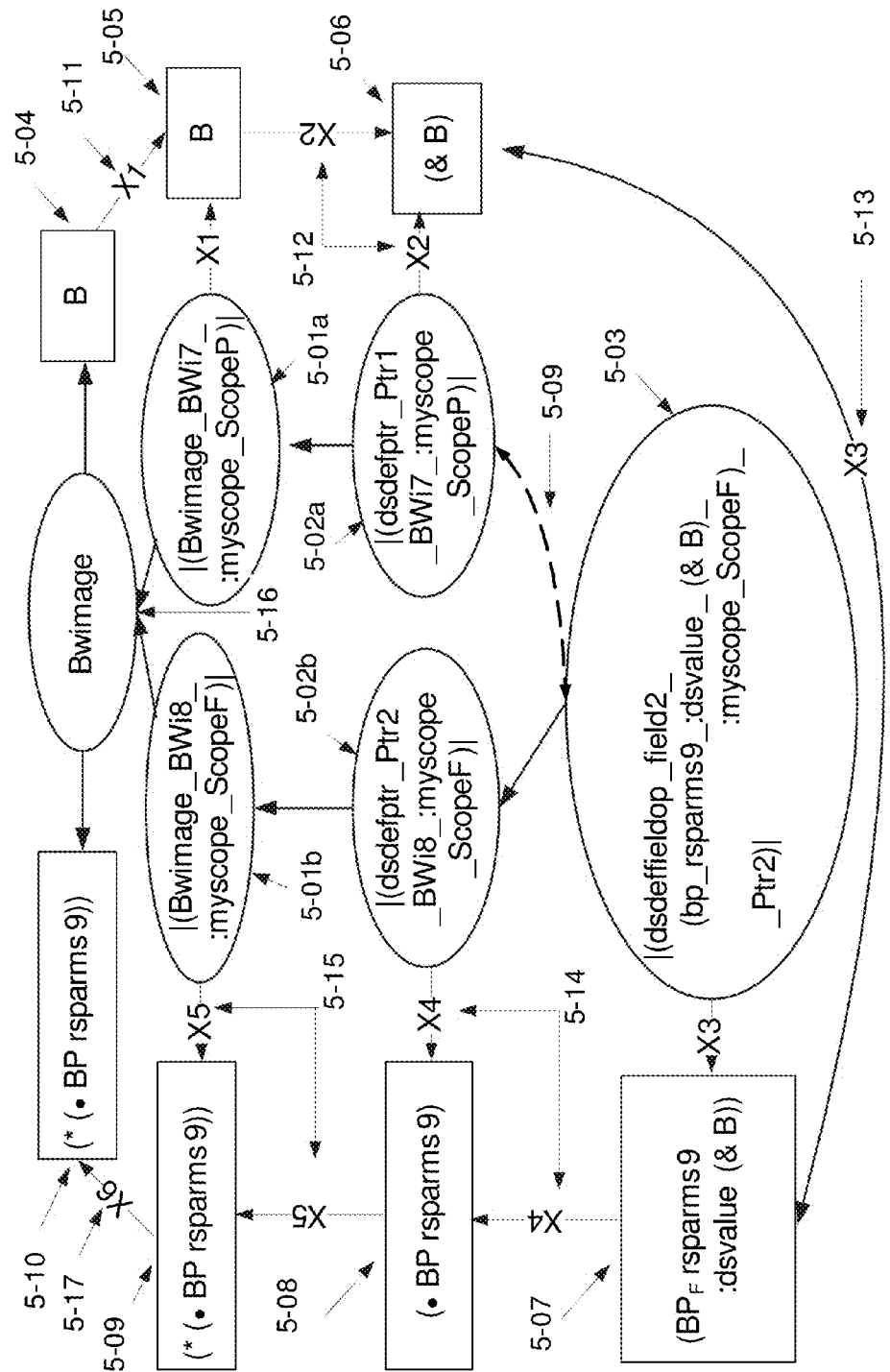

FIG. 5 provides a concrete example that may be used to solve part of the problem illustrated in FIG. 1. As a debugging aid in the preferred embodiment, CQ Type names are designed to expose both the base programming data type (e.g., "BWImage" or "int") as well as their qualifying property pairs (e.g., ":myscope ScopeF"). The implementation machinery of the preferred embodiment necessitates some special syntax within the type names, specifically, underscores to bind the name parts together and vertical bars to delineate the beginning and ending of the type name. All CQ Types will have "tags" that uniquely identify them (E.g., BWi7, Ptr1 or Field2). These tags may be used in a CQ Type name to reference another CQ Type (e.g., BWi7 in type Ref. 5-02a references its super type Ref. 5-01a).

The instance to instance transformations of FIG. 5 make it clear that subtyping within CQ Types is used to capture subpart/superpart relationships (among others) between design constructs, and thereby, it also may imply the construction/deconstruction operations required to achieve transitions between design views and/or design contexts. For example, "B" (Ref. 5-04) from the computation specification context represents the same entity as "B" (Ref. 5-05) within the payload scope context but "(& B)" (Ref. 5-06) is a computational form that represents one step further on the pathway to the full computational equivalence finally realized in Ref. 5-09.

Harvesting the transformations implied in FIG. 5 (i.e., X2 through X5) by differencing the CQ Types and applying those transforms to a payload oriented expression like $$\text{PartialAns}=(B[idx13+(p29-1)][idx14+ (q30-1)]*w[p29]/q30]); \tag{1}$$

will convert (1) into a design framework context expression like $$\text{PartialAns}=((*(\text{rsparms9}.BP))[idx13+ (p29-1)][idx14+(q30-1)]*w[p29]/q30]); \tag{2}$$

thereby allowing it to be relocated into a hole in the TDF design framework (e.g., Ref. 1-03), once the other payload context specific entities (e.g., "idx13", "idx14", "p29", etc.) requiring conversion are similarly redesigned. Note that the forms of FIG. 5 (e.g., Ref. 5-09) are the internal representations within an assumed automated program generator (e.g., the preferred embodiment) and do not yet have a programming language surface syntax added, which would turn that internal form into a legitimate programming language textual form. However, in expressions (1) and (2), the surface syntax for the C programming language has been added for the reader as an expository device. That is, in FIG. 5, Ref. 5-09 is the internal Lisp list structure "(*(● BP rsparms9))" but in expression (2), that internal list structure is shown as the C code text string "(*(rsparms9.BP))".

The computational context of the PartialAns example is the convolution of 2D digital images (where "B" is the image from the example). The deeper programming language design context (i.e., problem and programming specific domain knowledge) for these expressions is as follows: idx13 and idx14 are variables that index over some image matrix B; p29 and p30 are offsets for pixels in a neighborhood around the "current pixel" "B[idx13, idx14]"; and w is an array of multiplicative coefficients defining the relative contribution of a neighborhood pixel to the overall magnitude of the PartialAns value. In a complete description of the required redesign operations for this example, analogous CQ Type chains would exist for the instances idx13, idx14, p29, p30, as well as other data entities. These would engender analogous conversions for these data entities.

While the example in this paper uses the names B, idx13, idx14, p29 and p30 for concreteness, DSLGen uses an abstract domain specific model for the computation it is operating on. That is to say, it models a convolution in terms of image matrix abstractions, matrix index abstractions, neighborhood abstractions and neighborhood loop index abstractions none of which map into concrete programming language names and entities until very late in the generation process. That is, mapping DSLGen's domain abstractions (e.g., neighborhood loop index abstractions) into concrete names like idx13 and idx14 is deferred until the overall design is complete and the design has stopped evolving, because during that evolution process, the associations between domain abstractions and concrete target names will change to accommodate the evolution of the design. That being said, the author believes that the use of concrete names for this description will aid the reader's understanding of the process and therefore, this document will continue to use concrete names.

Next, we will define the machinery required to construct FIG. 5 from more generalized parameterized type specifications and the additional machinery needed to harvest transformations that will accomplish redesigns. By this added machinery, an infinite variety of FIG. 5 like concrete models can be created from one parameterized seed version of FIG. 5.

Solving Simultaneous Parameterized Type Equations

The CQ types of FIG. 5 contain design elements that are custom formulated to produce one set of redesign transformations that are specific to the data entity "B" (because of the field names in type 5-03) within a specific target computation that is to be transformed from a specific payload context to a specific framework context. In order to solve the complete problem that is described in Section 1, other analogous CQ Type chains and redesign transformations will have to be developed for other specific data entities in that target computation (e.g., other image variables such as various loops' start, end and increment variables, e.g., "Idx14"). Since it would be a serious impediment to full automation of the generation process to require a human to custom build of each of the individual type structure analogs of FIG. 5 for all of the data entities within a specific computation, there needs to be a single precursor form or forms from which all type analogs and type difference transformation analogs associated with the target computation (including those in FIG. 5) can be automatically derived. That single precursor form comprises:

1) A set of simultaneous parameterized type equations (expressions (3)-(7) below) that capture the relationship elements (i.e., type chains) illustrated in FIG. 5 that are common to FIG. 5 and the many analogs of the FIG. 5 (e.g., analogs include diagrams for idx13, idx14, p29, p30 and so forth), where the elements that vary from analog to analog are represented by variables (e.g., "?itype" represents the base type, such as "Bwimage" or "int").

2) Design engineer created parameterized type difference transformations specific to some framework (e.g., the TDF framework). These express the cross connection mapping between the two or more non-functionally related subtrees. One of these TDF framework supplied difference transformations is shown as expression (9) below. The cross connection transformations are identified in FIG. 5 as Ref. 5-13 (labeled X3). Ref. 5-13 represents both mappings to and from instances of the types 5-02a and 5-03.

The remainder of this section will describe that parameterized precursor specification of FIG. 5, i.e., the set of simultaneous type equations shown as expressions (3)-(7) below. This section will describe the process by which those type equations are incrementally solved to produce concrete CQ Types (Refs. 5-01a & b, 5-02a & b, and 5-03) and simultaneously to produce type difference transformations (Ref. 5-12 through 5-15 in FIG. 5), which are represented more concretely, as expressions (8)-(11) below. In the course of these steps, the type difference transformations are incrementally applied to a starting instance of one of those types (Ref. 5-05) and then to its derivatives (5-06 through 5-08) to derive the correspondence between "B" in scopeP and the equivalent glue code "(*(●BP rsparms9))" in scopeF, which will eventually become the C language text string "(*(rsparms9.BP))".

The simultaneous parametric type equations for generating FIG. 5 are expressions (3)-(7):

$$(?t1=(?itype\ :myscope\ ?Pscope:Instname\ ?StartInst))\ ;;spec\ for\ type\ 5-01a \quad (3)$$

$$(?t2=(DSDefPtr\ ?t1\ :Instname\ ?PPtrinst))\ ;;spec\ for\ type\ 5-02a \quad (4)$$

$$(?t5=(?itype\ :myscope\ ?Fscope))\ ;;\ spec\ for\ type\ 5-01b \quad (5)$$

$$(?t4=(DSDefPtr\ ?t5:Instname\ ?FPtrinst))\ ;;\ spec\ for\ type\ 5-02b \quad (6)$$

$$(?t3=(DSDefFieldOp\ (?Fldname\ ?Structname\ :dsvalue\ ?PPtrinst\ :myscope\ ?Fscope\ :Instname\ ?Fldinst)\ ?t4))\ ;;\ spec\ for\ type\ 5-03 \quad (7)$$

The type constructor functions used in these expressions (i.e., DSDefPtr, DSDefFieldOp as well as the qualified programming language data types of the form "(<atype><qualifiers> . . . ))" will be described here informally. This description in combination with the contextual intuition provided by FIG. 5 should provide sufficient insight to understand the essence of them and the associated process. However, the full set of type constructors available in the preferred embodiment (i.e., DSLGen) (e.g., the DSDef . . . constructors for Ptr, Field, Struct, Bit, Enum, Union, Function, Array and qualified programming language data types) is described more completely and formally in FIGS. 1a-c. Any additional user defined type constructors must follow the same patterns.

Basically, each equation's right hand side is a type constructor expression of the form (operator . . . arguments . . . ), which specifies a composite CQ Type. Implied functionally related types within these forms are expressed via the variables ?t1, ?t2, etc., and represent recursively related CQ types (typically related via type/supertype relationships). For example, the equation (4) of the form "(DSDefPtr ?t1 . . . )" is a pointer type (which will eventually become type 5-02*a*). The referenced supertype is represented by the variable ?t1, which is bound to the "(?itype :myscope ?Pscope)" type specification from equation (3). ?t1 will become the type 5-01*a* in FIG. 5. The ":name value" pairs in these expressions (e.g., ":myscope ?Pscope") are qualifying information used to describe generator design contexts or features that fall outside of the strict domain of programming data types. Explanatory comments appear to the right of the double semicolons. The ":Instname '<?vbl>" pairs (omitted in FIG. 5 to save space) provide (quoted) simultaneous variable names to the type differencing routines that harvest the ReDesign transformations associated with type pairs. These variables provide global relationships among the individual type equations, the related type difference transformations and the instances upon which those difference transformation operate. For example, difference transformation (9) that relates types 5-01*a* and 5-02*a* will bind the instance of type 5-02*a* (e.g., "(& BP)") to the transformation variable name "?PPtrinst." That value of ?PPtrinst is later used in the value slot of the field instance (i.e., 5-07) being constructed for the field type 5-03. Expression (9) also contains some embedded Lisp code that will create a human friendly name for the pointer field thereby making the generated code a bit easier to understand. It concatenates ?Pinst's value (e.g., "B") with the letter "P" resulting in the pointer field being named "BP" in the Fscope context (i.e., "BP" in FIG. 5). It then calls "DSRuntimeDeclare" to declare "BP" to be an instance of type ?t1. The C language code generated to reference the BWimage B within the Fscope will be something like "(* (rsparms9.BP))" (see expression (2)). As the ReDesign transformations are reused for other variables from Pscope (e.g., "Idx14"), the associated programming language pointer fields will acquire analogous names (e.g., "Idx14P") and will cause the generation of analogous C language code forms "(*(rsparms9. Idx14P))" in the generated code.

To solve these type equations, we will need to use the type differencing transforms implied by these type relationships since they express the relationships of these CQ Types to legitimate instances of those CQ Types and thereby, they recursively constrain subsequent CQ Types and instances. For example, consider the type differencing transformation from ?t1 to ?t2, which is symbolically expressed as "(delta ?t1 ?t2)" and which is nominally defined by the transformation expression to the right of the "~" sign in expression (8) below. Within that transformation expression, the sub-expression to the left of the "=>" operator is the pattern of the (delta ?t1 ?t2) transformation. That pattern is an "AND" pattern (operationally the Lisp expression "$(PAND . . . )"). An AND pattern requires that all of its constituent sub-patterns successfully match some instance of type ?t1. That is, its first pattern element "?inst01" will succeed (because it is initially unbound) by matching an instance of type ?t1 (e.g., "B") and binding that instance to a pattern variable (i.e., "?inst01") where the variable name is uniquely generated by the machinery that generates the type difference transformation. The second pattern element of the AND operator, i.e., "?StartInst", will succeed by binding that same instance to the pattern variable (i.e., "?StartInst"), where "?StartInst" was supplied by the property pair ":Instname '?StartInst" from the specification of type ?t1 shown in expression (3). If the pattern match is successful, then the right hand side of the transformation (i.e., the expression to the right of "=>", which is "(& ?inst01)") will convert ?inst01 to an instance of ?t2 (i.e., "(& B)"). Subsequently, the next type difference (i.e., "(delta ?t2 ?t3)" defined in expression (8)) will bind that newly created instance (i.e., "(& ?inst01)") to the variable ?PPtrinst, which will eventually be used in the dsvalue slot of ?t5.

The transformational essences that are the results of differencing the functionally related types in equations (3)-(7) are shown in the expressions (8)-(11). Difference (8) just effects the operation defined by the DSDefPtr constructor of type equation (4). Similarly, the differences (10) and (11) just express the implied inverses of the type constructors DSDefFieldOP and DSDefPtr of type equations (7) and (6). Difference (9) is the cross context mapping relationship and is supplied by the design framework TDF in the generator's library. The TDF framework is built specifically for generating the pattern of adaptive "glue code" that we have been discussing up to this point.

$$((\text{Delta } ?t1\ ?t2)\sim(\$(pand\ ?inst01\ ?StartInst)=> \\ (\&\ ?inst01)))\ ;;\ ?inst01\ \text{is globally unique name} \quad (8)$$

$$((\text{Delta } ?t2\ ?t3)\sim;;\ \text{Cross Connection written by a} \\ \text{Design Engineer for TDF } (\$(pand\ ?PPtrinst \\ \$(plisp\ (\text{MakeBinding '?Fldname }(DS\text{Runtime-} \\ \text{Declare (quote ?t1) (symb ?Start-} \\ \text{Inst '}P))))))\ =\geq(?\text{Fldname ?Struct-} \\ \text{name :}ds\text{value ?PPtiInst})))\ ;;\text{Field Def. form} \quad (9)$$

$$((\text{Delta } ?t3\ ?t4)\sim;;\ \text{Field def. form to dot operator} \\ (\$(pand\ ?\text{Fldinst (?fld ?struct :}ds\text{val-} \\ \text{ue ?PPtrinst}))=>(\bullet?\text{fld ?struct}))) \quad (10)$$

$$((\text{Delta } ?t4\ ?t5)\sim;;\ \text{Dereference pointer result} \\ \text{of dot operation } (\$(pand\ ?\text{inst02} \\ ?F\text{Ptrinst})=>(*\ ?\text{inst02}))) \quad (11)$$

Operationally (in the preferred embodiment), these type Delta transformations are implemented by ReDesign multi-methods that are uniquely determined by the method name ("ReDesign) plus their first two arguments, type1 and type2. ReDesign methods also take additional arguments: 1) an instance of type1, and 2) an initial set of bindings. The initial bindings include bindings determined by the TDF framework context (e.g., the bindings "(?itype bwimage)" and "(?structname rsparms9)"); bindings that arose during type equation solution process (e.g., "(?t5 |(bwimage_bwi8_:myscope_scopef)|)"); and bindings created by previously processed ReDesign steps (e.g., "(?startinst B)").

(Note: In the preferred embodiment, these ReDesign multi-methods are expressed in the CLOS (CommonLisp Object System) language embedded in CommonLisp. They are automatically generated during the process that solves the type equations for concrete types. See the macro "BuildARedesigner1StepXV1" that builds these ReDesign methods in FIG. 11 and a generalized prototype of such a ReDesign method in FIG. 12. See also the calls to "BuildARedesigner1StepXV1" in the constructor functions in FIGS. 7-10. The single exceptions to automatic generation are any cross type differencing methods (e.g., expression (9)), which implement elective design feature transitions and are written by the Design Engineer at the time the design framework (e.g., TDF) is created and entered into the reusable library of frameworks.)

So, conceptually what does a ReDesigner do and how does it operate? Expression (12) is some CommonLisp like pseudo-code that specifies the conceptual essence of a ReDesigner's processing.

```
(ReDesign type1 type2 instance bindings) ::=                    (12)
    (let ((newinstance nil))
        (multiple-value-bind (success postmatchbindings )
            (match (LHS (Delta type1 type2)) instance bindings)
            (if success (setf newinstance
                (applysubstitution (RHS (Delta type1 type2))
                                    postmatchbindings)))
            (values success postmatchbindings newinstance)))
```

In (12), the CommonLisp multiple-value-bind operator defines a scope with two local Lisp variables (i.e., success and postmatchbindings) to receive the multiple values returned from the match routine. Match matches the left hand side (LHS) pattern of the specific type Delta transformation (which is determined by ?type1 and ?type2) against the instance. The match starts using the existing bindings in the variable "bindings". If the match is successful (i.e., success equals "t" on match's exit), then the new instance will be the right hand side (RHS) of the Delta instantiated with the bindings returned from match, i.e., postmatchbindings, which are the initial bindings extended by any new bindings created by the match routine (e.g., "(?startinst B)"). The ReDesigner returns three values: 1) the success flag, 2) the postmatchbindings and 3) the newinstance, where the latter two variables will have legitimate values only if success equals t.

Before the type equations are solved, a typical set of initial bindings supplied by the TDF setup code might be expression (13):

```
((?itype bwimage)(?pscope scopep)(?fscope scopef)
    (?structname rsparms9))                                      (13)
```

After the type equations are solved, creating a set of types like those shown in FIG. 5, expression (13) will be extended with bindings of concrete types for the variables ?t1, ?t2, ?t3, ?t4 and ?t5. Following that process, all of the difference expressions (8-11) will be processed, resulting in a set of final bindings that might be something like expression (14):

```
((?fptrinst (● bp rsparms9))(?inst02 (● bp rsparms9))
    (?fldname bp) (?pptrinst (& b))(?inst01
    b)(?startinst b)(?fldinst (bp rsparms9:dsvalue (&
    b))) (?struct rsparms9)(?itype bwimage)(?pscope
    scopep)(?fscope scopef) (?structname rsparms9)
    (?t3 |(dsdeffieldop_Field2_(?fldname_r-
    sparms9__:dsvalue__?pptrinst_:myscope _scopef:
    instname_"?fldinst)_ptr2)|) (?t4 |(dsdefptr_ptr2__
    bwi8_:myscope_scopef:instname_"?fptrinst)|)
    (?t5 |(bwimage__bwi8_:myscope_scopef)|) (?t2
    |(dsdefptr_ptr1__bwi7_:myscope_scopep_:inst-
    name_"?pptrinst)|) (?t1 |(bwimage__bwi7_:my-
    scope_scopep_:instname_"?startinst)|)            (14)
```

The chain of instances produced by this process is shown in expression (15):

```
b, (& b), (bp rsparms9 :dsvalue (& b)), (● bp
    rsparms9), (*(● bp rsparms9))                    (15)
```

Thus, "b" from expression (1) in scopep will map into the expression "(*(● bp rsparms9))" within expression (2), which is in scopef. When the C language surface syntax is added at code generation time, it will be re-expressed as the C language form "(*(rsparms9.bp))".

Domain Driven Instantiation of Existential Variables

Viewing the solution process just described from a slightly different angle, we will observe that this solution process has taken a very hard problem (i.e., instantiation of existential variables) and changed it into a relatively easy problem (e.g., solving simultaneous equations for type difference transformations that, in the course of code redesign, will automatically instantiate existential variables with exactly the right value for the specific situation). This problem transformation happens because of a change in the underlying representational context. In the first case, the representational context is that of formal logic and in the second case, the representational context is domain driven design. More specifically, the domain driven design machinery is a novel mechanism for constraining design features and relationships and importantly, for applying those design features and relationships in an automated solution process of adapting and synchronizing disparate programming components. Let us look at this difference at a more detailed level.

Were we to represent part of the problem solved by this invention in formal logic, it might be expressed something like $$\forall P \exists F \exists S: (P \in \text{<payload-vbls>}) \& (S \in \text{<framework-structs>}) \& (F \in \text{<struct-fields>}) \& \text{fieldof}(F,S) \& (\text{value}(P) = \text{value}(S.F)) \quad (16)$$

Informally, this expression says: for each variable P, there exists variables F and S, such that P is a payload variable, S is a framework struct, F is a struct field variable, F is a field of S and the value of the payload variable P is equal to the value of the F field of S.

(Note: I have taken some liberties with the notation in order to simplify the expression and make it easier to understand. In particular, the sets to which P, S and F belong to are represented informally. Also, note that the "for all P" really should be further restricted to just those variables from the payload that the generator needs in the glue code it is about to construct. In this problem context, that would be messy and difficult to specify and would make the example even more difficult to understand. NB: These notes alone should forewarn the reader that a problem solving mechanism based on formal logic is probably not likely to be a very useful or practical or feasible approach to the problem this invention solves.) In a symbolic logic representation, the solution for each P variable in the payload context requires finding instantiations (i.e., values for) the "existential variables" F and S that will make expression (16) true. Existential variables are those used with the "there exists" operator (i.e., "∃"). The problem with this approach is that for each P, the search for F and S is as blind as a rat in a maze. The search blindly picks theorems and axioms to be applied until the solver stumbles upon a struct S and then further stumbles upon a field F of that struct S that meets all of the conditions in expression (16). Various styles of formal logic solvers provide various "tricks" for choosing (not quite so blindly) those axioms and theorems, but even so, the search may still end up being "exhaustive" or nearly so. That is, exhaustive searches may have to search all or pretty nearly all of the theorems and axioms and may have to string the theorems and axioms together in pretty nearly all possible orders. In the end, it is often the case that a very simple problem may require thousands of trials before a solution is found or the absence of any solution is determined (after exhausting all possible solution paths). So, formal logic solvers take little or no advantage of domain knowledge to guide them to a solution, in large part because there is little understanding of how to do that effectively.

By contrast, expressing the problem as a partially solved problem as with this invention leads rapidly, directly and inevitably to correct instantiations of existential variables that provide a concrete solution to the problem for various starting instances of the CQ Types. That is, the framework design (e.g., TDF) is already so constrained by the relationships that few if any alternative solution paths need to be explored to instantiate the existential variables. The solution process is purposeful and prescriptive. It drives directly to the solution taking advantage of partial knowledge of the solution provided by the design framework. For example, the relation between the struct and the field is prescribed by the TDK design framework. Instances of both get created and defined such that their relationship is built into the data by the design framework. Similarly, scopep and scopef are prescribed by the TDK design framework that will use them in a very prescribe way. The value of the existential variable ?itype is not prescribed by the design framework but it is easily determined by examination of the code that needs to be redesigned. So, before the generator even begins to solve the type equations and redesign the code, the instantiations of key existential variables have been inexorably determined. Furthermore, the type difference based redesigners in conjunction with the relationships encoded in the type equations makes computing instance instantiations from other related instance instantiations direct and simple. For example, ?PPrinst in type equation ?t2 will be instantiated with the instance that is a pointer to the image (e.g., "(& B)"), which because of the type difference transformation between ?t2 and ?t3, will become the value field of the pointer field "BP" in the scopef context (i.e., in the glue code being generated). The ?t2 equation determined the instantiation of ?PPtrinst by seeding the generation step that manufactured the ?t2 to ?t3 type difference LHS with a pattern that will match the current instance of type ?t2 and bind it to ?PPtrinst. Once a starting instance of type ?t1 (i.e., "B" in this case) is chosen, the binding value of ?PPtrinst is implicitly fully determined. Operationally, the type difference transformation from type ?t2 to type ?t3 did the (trivial) work of actually instantiating ?PPtrinst with the concrete instance value (e.g., "(& B)" in the case we are following).

In summary, there is virtually no search for existential variable bindings with this invention. They are inexorably determined by the structures and relationships already encoded into the TDF design framework at the time the framework is created (and presumably entered into some reusable library).

Not all cases of generation preclude search but the model of generation specified in this and its related inventions diminishes search to relatively trivial dimensions. A case where search cannot be completely avoided is illustrated by type difference transformation X1 (Ref. 3-01) in FIG. 3. This type difference transformation is converting an instance (e.g., "b") that is an array of ints (i.e., its type is "|(dsdefarray_(M)_int) |") into an instance (e.g., "b[idx3]") that is an int (i.e., its type is simply the C programming language data type "int"). The problem, of course, is that the type difference transformation will have to introduce an existential variable, say "?idx" to index the array "b". ?idx is going to have to be bound to a value that is a program variable in the target program being generated, say "idx3". Where did "idx3" come from and how did the generator variable ?idx get bound to the target program variable "idx3"? And more to the point in the context of this discussion, was there any search required? In answer to the second question first—yes, with qualification. There is some search but trivially little and the reason for so trivially little search is ARPS and the domain specific knowledge that the generator uses to model the evolving target program being generated.

This type difference transformation is not operating in a vacuum. It is operating in the context of the generator's logical model of the evolving program design. That logical model keeps track of relationships between elements of the problem domain (e.g., knowledge about signal convolution operators and knowledge about how they might get translated into program language implementation) and actual instances of the evolving program language implementation (i.e., instances of parts of the actual implementation structures).

Assuming the context of the example under consideration is a one dimensional (i.e., signal) convolution operation, the logical model of the evolving program would know the relationship between parts of the evolving implementation. Specifically, it would know that in the context where "b" is encountered, is it translating a convolution expression involving "b" and it would further know the a target program instance variable named "idx3" has been designated as the instance variable to be used in that convolution. Given that knowledge, the type difference transformation would generate an ARPS expression for the value to be bound to ?idx that anaphorically references the target program variable "idx3" from the logical model. Paraphrasing, the ARPS expression says something like "go to the logical model and get the variable name used for array indexing in the convolution of b". When that ARPS expression gets resolved, ?idx would get bound to "idx3". The ARPS expression is highly prescriptive and "searches" a trivially small search space. So, the word "search" is hardly descriptive of what is going on in this case. It is a "search" in the weakest sense of the word and bears little relation to the extended searches often engendered by symbolic model based problem solving. The ARPS expression is more like travel instructions that say go three blocks, turn left, stop at the lime green house with pink shutters and you have reached your destination.

In summary, domain driven instantiation of existential variables using the machinery of this invention is fundamentally different from instantiation of existential variables in the context of symbolic logical problem solving methods. It is prescriptive, direct and largely search free. It makes direct use of domain knowledge that is expressed in a fundamentally new and novel way, where that domain knowledge is applied by novel problem solving machinery, and where that domain knowledge is highly useful in program generation because it efficiently produces solutions to problems that heretofore have not been feasibly solvable by automated means.

Recursive Type Constructors

The machinery used to synchronize disparate componentry uses the type system to simultaneously express (within a single CQ Type) a conventional data type and a design context point of view for that conventional data type. It accomplishes this by defining a CQ Type as a recursive expression of other CQ Types that capture both the programming data type and the design point of view within some recursively defined design space. The pattern of types and subtypes will recapitulate that pattern of recursion. That is, a CQ Type is some functional composition of its subtypes (if it has subtypes). For example, a pointer to a BWImage type is a subtype of a BWImage. Thus, type/subtype structures mimic the specialization and generalization of a design space. However, not all design space relations are specialization or generalizations. Some relations are bridges between design spaces that neither specialize nor generalize design context. They transform design contexts. That is, they establish a transformation or a mapping between design contexts. The cross connection transformation (Ref. 3-09) is just such a bridge. In this case, the design point of view for the BWImage entity has transitioned from a simple design (i.e., the payload) to a different design context (i.e., framework context that will contain the "glue" code being manufactured by the generator to synchronize the computational contexts). Within the framework context, the BWImage data entity must have the computational form of a value within a field of the struct manufactured by the generator, where that value will be represented as a pointer to the original data instance. That is, in the payload context, the BWImage entity might have the computational form "b" whereas in the related framework context, that data entity might have the computational form "(*(csparm9.bp))". The computational forms both refer to the same entity but from different design context points of view.

In general, transitions within a design space, be they generalizations, specializations or bridge transformations, represent a transition of design point of view. And this transition may or may not require a transformation of the computational form for a data entity. So, how do we build such a design space?

The part of the invention that implements this machinery is defined by a few basic constructor elements. A sampling of these constructor elements is expressed below in an extended BNF (Backus-Naur Form), where non-terminals are enclosed in angle brackets and terminals are enclosed in double quotes. Square brackets indicate optionality, braces indicate grouping, and double bars indicate alternation (i.e., "or"). Parentheses indicate CommonLisp like lists and sublists. The symbol string "::=" is read as "is defined as" in BNF and the symbol to the left of that string is the symbol being defined, which in BNF is a "non-terminal" symbol, meaning that it is a composite entity.

The following sampling of definitions illustrates the form of some typical CQ Type constructor expressions and includes some examples from the results of expression 14:

<ArrayType>::=("DSDefArray" [<tag>] (<D1> <D2> . . . )<atype><keyword parms>)

Example CQ Type: |(dsdefarray_array4_(m_n)_colorimage_:instname_'?foo)|

<FieldType>::=("DSDefFieldOP" [<ftag>] (<fieldname><structtag><keyword parms>) <resulttype>)

Example CQ Type: |(dsdeffieldop_Field2_(?fldname_rsparms9_:dsvalue _?pptrinst_:myscope_scopef_:instname_'?fldinst)_ptr2)|

<StructType>::=("DSDefStruct" [<stag>] ((<ptype1><name1><keyword parms>) (<ptype2><name2><keyword parms>) . . . ))

<PointerType>::=("DSDefPtr" [<ptag>]<supertype><keyword parms>)

Example CQ Type: |(dsdefptr_ptr1_bwi7_:myscope_ scopep_:instname_'?pptrinst)|

<PLType>::=(<type>[<ttag>] [<PLqualifiers>] [<keyword parms>)])

Example CQ Type: |(bwimage_bwi7_:myscope_scopep_: instname_'?startinst)|

Beyond the CommonLisp syntactic framework in which these type specifications are embedded, these CQ type expressions borrow a elements from the C programming language, which is the default language emitted by the generation system of the preferred embodiment. As with their C counterparts, the optional "tag" fields provide a handle for the composite type. The <keyword parms> (e.g., the keyword ":myscope" paired with the value "ScopeF") provide the mechanism for qualifying types with design features, design contexts or other qualifications specific to the generation process and outside of the domain of programming language data types. Keyword based qualifications are "meta-qualifications" since they are "meta" to the types that are specific to the programming language domain. The list of <ptype n> groups within StructType definition is shorthand for a list of DSDefFieldOP types.

In addition to program generation specific qualifiers, the qualifiers used in the PLType definition may also include vanilla programming language data types and data type qualifiers, e.g., C type qualifiers. For example, C's<storageclass> qualifiers may include auto, extern, register, static and typedef; C's<typequalifiers> may include const, restrict, and volatile; and C's<type-spec> may include short, long, signed, and unsigned. The definition of these qualifiers is open ended. So, adding other data type qualifiers from other programming languages is legitimate and easy.

Declarations of instances of CQ types are created via the following statement.

<Declaration>::=(DSDeclare <CQ Type Expression>[<Instance>])

PRIOR ART

From the most general perspective, the purpose of this research is program generation. However, the details of the machinery in this paper are most closely related Programming Data Type technology. Therefore, we will focus on the relationships and differences between the CQ Type technology area the prior art in programming date type area.
(For more information, see:

Luca Cardelli and Peter Wegner, "On Understanding Types, Data Abstractions, and Polymorphism," Computing Surveys, Vol. 17, No. 4, December, 1985; Luca Cardelli, "Type Systems," CRC Handbook of Computer Science and Engineering, 2nd Edition, Ch. 97, 2004;

Barbara Liskov and Jeannette Wing, "A Behavioral Notion of Subtyping," ACM Transactions on Programming Languages and Systems, 1994; and Barbara Liskov and Jeannette Wing, "A Behavioral Subtyping Using Invariants and Constraints," Carnegie Mellon Report CMU-CS-99-156, 1999).

Broadly speaking, data types have been used in the pursuit of several different but related objectives:

Type checking and inference to reduce errors in the context of strongly typed programming languages, Program language design for enhancing reusability of code (e.g., through abstract data types, object oriented programming and polymorphism), Program language design to simplify programming and enhance the ability to write correct programs (e.g., via functional and applicative languages where types play a significant role in specification and compilation), Writing correct programs from formal specifications (e.g., stepwise refinement), Formal specification of the "meaning" (i.e., semantics) of computer programming elements (e.g., denotational semantics and models like the Z language or the VDM method).

The main difference between the CQ Types technology and previous data type technology is that CQ Types technology is operating (in part) in the design domain space (i.e., outside of the programming data type domain space) whereas previous work was to a greater or less extent operating strictly in the programming language data type domain space. That is, previous conceptions of types did not provide a way to express design concepts except to the degree that those design concepts were expressible in terms of programming language constructs or abstractions thereof. CQ Types allow such design concepts to be expressed, used, operated on and applied to creating a target program before those design concepts are expressed or even expressible in terms of programming language constructs or abstractions thereof. Further, these CQ Type design concepts used prior to the formulation of programming language constructions or code that reflects the design concepts is necessary and essential to the automated creation of those formulations of programming language constructions or code.

To choose a concrete example from the prior art, consider the Liskov substitution principle. This principle "seems" to bear some cosmetic relationship to CQ Types and their associated operations in the sense that the work is characterizing the situation in which a subtype is computationally substitutable for its super type in a code. That is, the Liskov substitution principle is superficially similar to the CQ Type work in the sense that it deals with mapping one form of programming language code to a related form. However, it is completely different it two obvious and important ways. The Liskov substitution principle works strictly within the domain of programming types and the type/subtype relationship depends on some implicit property of the types. CQ Types are defined specifically to work within and capture knowledge about the design and generation space (as opposed to just the programming data type space) and thereby those CQ Types involve entities (e.g., design features and design contexts) that are not explicit elements of the programming data type domain. Furthermore, the relationships among CQ Types are explicit rather than implicit and they explicitly capture differences in computational structure that are due to implicit relationships within the design and generation domains (i.e., outside of programming data type domain).

SUMMARY AND CONCLUSIONS

CQ Types provide a mechanism for expressing abstract constraint relationships between entities within the design space and thereby a mechanism for implicitly specifying plans for adapting and relocating code from one design context to another. This allows a generator to evolve logical designs for a computation by adding elective design features (e.g., threaded parallelism) to pedestrian and perhaps inefficient designs of a computation and to provide the ability to automatically make the necessary conversions from simple computational forms into a more desirable but perhaps more complicated computational forms.

CQ Types can be assembled into large grain relationships by expressing those large grain relationships as systems of simultaneous type equations and type difference transformations. Importantly, these large grain relationships can be abstracted (i.e., parameterized) such that they can be applied to an unlimited (and potentially infinite) set of concrete cases. Parameterization allows these large grain relationships to adapt and synchronize some yet-to-be-determined concrete code (e.g., payload code) to fit into an abstracted design framework (e.g., TDF). When solving for the values of those parameters in the context of some specific payload code, the equations and difference transformations will become specialized to the specific payload code and thereby provide a redesign scheme tailored to the payload code to be merged into the abstracted design framework (e.g., TDF). This allows design frameworks to express only those design features and elements that are pinned down by the framework, e.g., the abstract relationship between a yet-to-be-determined variable in a payload and its yet-to-be-determined field representation within a structure that connects the payload data to the framework operations. Once the payload has been identified to the generator, the yet-to-be-determined elements can be computed by the generator to complete a fully integrated design for the target program. For example, the abstract relationship between a yet-to-be-determined variable in a payload and its yet-to-be-determined field representation within a structure that connects the payload data to the framework will become a concrete relationship specific to the specific payload.

This invention provides significant programming productivity improvement through the amplification provided by the invention of reusable, parameterized, large grain abstractions that can be applied to an unlimited number of concrete cases and the operational machinery of this invention that automates the application of those abstractions to that unlimited number of specific cases to generate target application code.

SEQUENCE LISTING

Not Applicable

What is claimed is:

1. A computer implemented method of automatically solving simultaneous parameterized equations of context qualified types for solution elements comprising:
    1) other context qualified types implied by equation parameters,
    2) code instances of said context qualified types and
    3) type difference transformations that redesign instances of code from one design context specified by one context qualified type to a second design context specified by a second context qualified type, where said solution elements are used to automatically redesign, synchronize and integrate separate code components or precursors thereof into an integrated, synchronized solution code component, where each one of said separate code components achieves a portion of a desired computation and said integrated, synchronized solution code component achieves all portions of said desired computation,
    wherein an atomic context qualified type is a composition of a programming language data type and a set of qualifiers for said programming language data type, where said set of qualifiers express human oriented conceptual notions that are not expressible in terms of programming language constructs or data types,
    wherein a composite context qualified type is expressed as a composition of a context qualified type constructor applied to other atomic or composite context qualified types as its arguments, and where said composition includes a set of qualifiers for said composite context qualified type that express human oriented conceptual notions that are not expressible in terms of programming language constructs or data types,
    wherein a composite context qualified type is a specialization of said other atomic or composite context qualified types that are said arguments of said context qualified type constructor, comprising:
    acquiring a specification of a desired computation from a plurality of sources including but not limited to an application programmer, a data base of reusable specifications or other source, where said specification specifies intent of said desired computation without information on how said desired computation is to be implemented,
    acquiring a design framework based on a computation's requirements and properties, where said design framework specifies design features of a desired implementation of said desired computation, where said design framework comprises 1) skeletal code achieving some portion of said desired computation; 2) a generator method that is specialized to said design framework and that manages building of said integrated, synchronized solution code component; 3) a set of said simultaneous parameterized equations of context qualified types specific to said design framework, and that constrains relationships within said integrated, synchronized solution code component; and 4) a set of said type difference transformations that are not implicit in said type equations and which are therefore elective type difference transformations specific to said design framework, automatically solving said simultaneous parameterized equations of context qualified types for unknown context qualified types implied by equation parameters, automatically deriving each of said type difference transformations that are implied by each pair of composite context qualified types specified in said simultaneous parameterized equations of context qualified types, where said pair comprises a first context qualified type and a second context qualified type, where either said second context qualified type is a specialization of said first context qualified type, or said first context qualified type is a specialization of said second context qualified type, automatically applying said type difference transformations to known code instances of said context qualified types in said simultaneous parameterized equations of context qualified types to produce new code instances of new context qualified types, where said new context qualified types are related by one or more said type difference transformations to said context qualified types of said known code instances, and automatically assembling said integrated, synchronized solution code component that achieves all portions of said desired computation from 1) said new code instances, 2) said skeletal code, and 3) each one of said separate code components that achieves a portion of a desired computation, where said assembling is achieved using said generator method that is specialized to said design framework; and constructing a type difference transformation between a first context qualified type and a second context qualified type, where said type difference transformation is automatically generated if said second context qualified type is a specialization of said first context qualified type, where specialization means that said context qualified type is a subtype either directly or recursively of said first context qualified type, or alternatively, where said type difference transformation must be manually generated if said second context qualified type is not a specialization of said first context qualified type and said first context qualified type is not a specialization of said second context qualified type.

2. A method of claim 1 where a context qualifier in said set of qualifiers may include but is not limited to design knowledge; design contexts; planning knowledge; generation process knowledge; process state and other process knowledge; knowledge defining, limiting, characterizing a phase of, characterizing a computational state of, or constraining a process for generating expressions of said programming language, programming notation or abstractions thereof; and a plurality of other human oriented conceptual notions that are useful in automatically generating computer programs.

3. A method of claim 1 for constructing type difference transformations between two sets of context qualified types, where a first set comprises a plurality of initial context qualified types and a second set comprises a plurality of specializations of said initial composite context qualified types, where said second set is created by applying context qualified type constructors to context qualified types within said first set, where said type constructors define inherent functional relationships between said plurality of initial composite context qualified types and said plurality of specializations of said initial composite context qualified types, where said inherent functional relationships are optionally further specialized by additional qualifications, where said inherent functional relationships automatically determine, for each of said plurality of initial composite context qualified types, a plurality of bi-directional difference transformations between a code instance of one of said plurality of initial composite context qualified types and a code instance of said each of said plurality of specializations of said initial composite context qualified types, whereby a difference transformation, if it exists, effects said inherent functional relationships by automatically converting a first instance of code from one of said plurality of initial composite context qualified types to a second code instance of one of said plurality of specializations of said initial composite context qualified types or performing an inverse conversion from said second code instance to said first code instance, comprising:

constructing an atomic context qualified type by adding context qualifiers to a programming language data type or by constructing a composite context qualified type by recursive application of a context qualified type constructor to a set of type based arguments and a plurality of non-programming language context qualifiers, constructing a specialization of said atomic context qualified type or said composite context qualified type via recursive application of context qualified type constructors to a plurality of type arguments that include said atomic context qualified type or said composite context qualified type and a plurality of context qualifiers, automatically creating said difference transformations based on said functional relationship, if said difference transformations can exist but have not yet been created, and introducing, based on domain specific knowledge, implied existential variables in a difference transformation, where said existential variables originate from context qualifications in a plurality of context qualified types, and where said implied existential variables are required to convert an instance of said composite context qualified type into an instance of said one or more previously defined context qualified types, or required to convert an instance of said one or more previously defined context qualified types into an instance of said composite context qualified type.

4. A method of claim 1 where an elective context qualified type difference transformation is manually created and supplied to relate two context qualified types that do not have a specialization relationship between said two context qualified types and therefore, have no inherent functional relationship between said two qualified types that would trigger automatic creation of a type difference transformation, comprising:

writing an elective context qualified type difference transformation left hand side pattern, whereby matching of said left hand side pattern against an instance of a first context qualified type will produce a set of variable bindings specific to said code instance of a first context qualified type, and writing an elective context qualified type difference transformation right hand side expression, which may contain pattern variables used in said transformation left hand side pattern, whereby instantiation of said right hand side expression with variable bindings specific to said instance of a first context qualified type will construct a code instance of a second context qualified type, and declaring said elective context qualified type difference transformation to be said difference transformation that converts code instance from first context qualified type to other said to said second context qualified type.

5. A method of claim 1 where an element of a context qualified type definition may be a precursor element that stands in for some concrete entity whose value is not yet know when said context qualified type is initially defined.

6. A method of claim 5 where said precursor element may be a variable parameter.

7. A method of claim 6 where said parameter within a context qualified type's definition may have a value that may be partially or fully determined by constraints outside of said context qualified type's definition.

8. A method of claim 7 for expressing context qualified type equations whereby a left side context qualified type parameter may be constrained to be equal to a right side context qualified type expression, where said left side context qualified type parameter is left of an equal sign and said right side composite context qualified type expression is right of an equal sign.

9. A method of claim 8 for defining a canonical form for a set of simultaneous parameterized context qualified type equations that when taken as a set provide a consistent set of constraints on parameter values within said set of simultaneous parameterized context qualified type equations such that parameters whose values are context qualified types are resolvable to a unique context qualified type, comprising:
  defining a left side context qualified type parameter to be equal to a right side context qualified type expression where said right side context qualified type expression has no embedded left side context qualified type parameters from said simultaneous parameterized context qualified type equations, or
  defining a left side context qualified type parameter to be equal to a right side context qualified type expression where said right side context qualified type expression has one or more embedded left side context qualified type parameters, and
  repeating previous steps until there is a type equation for each said context qualified type parameter, such that said context qualified type parameter appears as a left side context qualified type parameter.

10. A method of claim 9 for automatically solving said set of simultaneous parameterized context qualified type equations for values of parameters representing context qualified types by incrementally eliminating said parameters representing context qualified types from all right side context qualified type expressions, where a type equation is a triple comprising a left side context qualified type parameter, an equal sign, and an equivalent right side definition that optionally can contain context qualified type parameters, where said equivalent right side definition comprises a composite context qualified type expression or alternatively an expression with no context qualified type elements, where within a correctly formed set of simultaneous parameterized context qualified type equations, at least one context qualified type equation with no type parameters in said equivalent right side definition must exist because context qualified type specialization trees may not be cyclic, which implies a root context qualified type with no super context qualified types, comprising:
  selecting a context qualified type equation for a left side context qualified type parameter whose said equivalent right side definition has no embedded left side context qualified type parameters and substituting said equivalent right side definition into all other simultaneous context qualified type equations that contain said left side context qualified type parameter,
  repeating previous step until all left side context qualified type parameters have been eliminated from all right side definitions thereby automatically solving said set of simultaneous parameterized context qualified type equations for values of parameters representing context qualified types, or alternatively, until it is determined that said simultaneous parameterized context qualified type equations are insufficiently constrained where upon an a problem specification error is detected.

11. A method of claim 10 for automatically solving said set of simultaneous parameterized context qualified type equations for parameters other than parameters that specifically represent context qualified types, where said parameters include but are not limited to parameters whose value is determined by application of type differencing transformations, comprising:
  selecting a chain of context qualified types, where there exists context qualified type difference transformations for each pair of types in said chain,
  selecting a known instance of a first context qualified type in said chain,
  selecting a binding list comprising pairs of a variable parameter and a value of said variable parameter, where an initial value of said binding list is a set of variable and values pairs that are determinable before said set of simultaneous parameterized context qualified type equations solution process begins, and where said initial value of said binding list comprises variable and values pairs that are globally applicable to all equations in said set of simultaneous parameterized context qualified type equations,
  iterating all remaining steps of automatically solving for each pair of context qualified types in said chain plus an instance of a first context qualified type of said pair of context qualified types, and plus said binding list, and where each iteration, after a first iteration of said remaining steps of automatically solving, starts with a new pair of context qualified types shifted one type down said chain plus a new instance computed from an iteration just completed and plus said binding list with accumulated bindings from all previous iterations,
  selecting a context qualified type difference transformation from a first context qualified type in said pair of context qualified types to a second context qualified type in said pair of context qualified types, where said context qualified type difference transformation comprises a parameterized left hand side pattern that will match an instance of said first context qualified type and a parameterized right hand side that, when instantiated with parameter values from said binding list will become an instance of said second context, qualified type, where said binding list will include any new binding pairs determined by said match,
  matching said parameterized left hand side pattern against said instance of a first context qualified type of said pair of context qualified types to produce an additional list of binding pairs to be added to said binding list, and
  substituting each value of a binding pair for each parameter associated with said each value when said each parameter occurs in said parameterized right hand side, thereby producing an instantiated version of said parameterized right hand side, where said instantiated version of said parameterized right hand side is an instance of said second context qualified type.

12. A method of claim 11 for automatically introducing and instantiating existential parameters with values for said existential parameters as a side effect of solving a set of simultaneous parameterized context qualified type equations and applying context qualified type difference transformations to solve for instances of said context qualified types, where an existential parameter is a parameter that is required to have a value in order to automatically solve said set of simultaneous parameterized context qualified type equations for parameters other than parameters that specifically represent context qualified types, comprising:
  expressing said set of simultaneous parameterized context qualified type equations,
  introducing existential parameters implied by said set of simultaneous parameterized context qualified type equations,
  introducing existential parameters implied by said set of type differencing transformations associated with said set of simultaneous parameterized context qualified type equations, and
  determining said values of or stand-ins for said values of said existential parameters, by matching contexts of said existential parameters against type expressions and instance expressions.

13. A method of claim 9 for automatically instantiating existential parameters initially using stand-in values for said existential parameters as a side effect of solving a set of simultaneous parameterized context qualified type equations, where said stand-in values later become actual values when said actual values become determinable, comprising:
  determining Anaphoric Reference Protocol for Synchronization expressions stand-ins for said values of said existential parameters, and
  using said Anaphoric Reference Protocol for Synchronization expressions to determine said values.

14. A method of claim for 11 producing a potentially unlimited number of sets of concrete simultaneous parameterized context qualified type equations from a single, reusable set of simultaneous parameterized context qualified type equations, by instantiating initial global parameters whose values are not context qualified types nor instances of context qualified types, where said values include but are not limited to initial programming language types, qualification concepts, values that define code construction conventions and other constant values to be used in construction of code.

15. A method of claim 11 for producing a potentially unlimited number of concrete solutions to a single, reusable set of simultaneous parameterized context qualified type equations, where each of said concrete solutions comprises a set of functionally related concrete context qualified types and a set of context qualified type differencing transformations specific to pairs of said functionally related concrete context qualified types that satisfy said single, reusable set of simultaneous parameterized context qualified type equations, comprising:
  selecting a chain of context qualified types,
  selecting a known instance of a first context qualified type in said chain of context qualified types from a potentially unlimited set of said known instances of a first context qualified type, and
  using said method of automatically solving to produce a concrete solution to said single, reusable set of simultaneous parameterized context qualified type equations specific to said known instance.

16. A method of claim 1 for defining a design framework that codifies abstract design patterns for redesigning code from one design context to fit into a second design context, where said design framework uses knowledge from said one design context and from said second design context to generate initial elements for a process of creating redesigned code, and then to effect said process of creating redesigned code by using said initial elements,
  comprising:
    defining design framework parameters or constant values for initial elements required by said design framework, where said initial elements include but are not limited to initial skeletal code design structures that are allowed to contain parameters, initial skeletal data structures that are allowed to contain parameters and initial global constant values,
    defining a set of simultaneous parameterized context qualified type equations that abstractly characterize relationships between elements of said one design context and elements of said second design context, where said simultaneous parameterized context qualified type equations may potentially apply to a plurality of concrete code instances,
    defining a plurality of elective context qualified type difference transformations that connect non-interdependent pairs of context qualified types, where said non-interdependent pairs of context qualified types are not automatically connected by virtue of said non-interdependent pairs of context qualified types not being functionally related, where context qualified type difference transformations between said non-interdependent pairs of context qualified types are not determined by a priori defined functionally relationships and may therefore be arbitrary mappings determined only by goals of said design framework, and
    defining a generator method that is specialized to said design framework and that manages building of an integrated, synchronized implementation code component in which said skeletal code from said framework is instantiated with redesigned elements of code from a design context that specifies what a desired computation computes without specifying how said desired computation is implemented.

* * * * *